(12) United States Patent
Ito

(10) Patent No.: US 12,530,863 B2
(45) Date of Patent: Jan. 20, 2026

(54) GLASSES, RECOMMENDED COSMETICS PRESENTATION CONTROL SYSTEM, AND RECOMMENDED COSMETICS PRESENTATION CONTROL METHOD

(71) Applicant: ZOZO, Inc., Chiba (JP)

(72) Inventor: Masahiro Ito, Chiba (JP)

(73) Assignee: ZOZO, Inc., Chiba (JP)

( * ) Notice: Subject to any disclaimer, the term of this patent is extended or adjusted under 35 U.S.C. 154(b) by 590 days.

(21) Appl. No.: 17/791,604

(22) PCT Filed: Jan. 18, 2021

(86) PCT No.: PCT/JP2021/001445
§ 371 (c)(1),
(2) Date: Jul. 8, 2022

(87) PCT Pub. No.: WO2021/153305
PCT Pub. Date: Aug. 5, 2021

(65) Prior Publication Data
US 2023/0033535 A1 Feb. 2, 2023

(30) Foreign Application Priority Data

Jan. 31, 2020 (JP) .................................. 2020-014570

(51) Int. Cl.
*G06V 10/56* (2022.01)
*A45D 44/00* (2006.01)
(Continued)

(52) U.S. Cl.
CPC ........... *G06V 10/56* (2022.01); *A45D 44/005* (2013.01); *G01J 3/463* (2013.01); *G06T 7/90* (2017.01);
(Continued)

(58) Field of Classification Search
None
See application file for complete search history.

(56) References Cited

U.S. PATENT DOCUMENTS

| 5,786,881 A | 7/1998 | Monroe |
| 11,058,208 B2 | 7/2021 | Lassalle et al. |

(Continued)

FOREIGN PATENT DOCUMENTS

| CN | 107992835 A | * | 5/2018 |
| CN | 110400354 A | | 11/2019 |

(Continued)

OTHER PUBLICATIONS

Optometry Times; Monmouth Junction vol. 6, Iss. 3, (Mar. 2014): 26,28. (Year: 2014).*

(Continued)

*Primary Examiner* — Rufus L Phillips
(74) *Attorney, Agent, or Firm* — Oliff PLC

(57) ABSTRACT

Glasses are used to determine a color of each position of a face of a user by a computer system based on first image data (with-glasses face image) obtained by capturing an image of the user wearing the glasses, and second image data (no-glasses face image) obtained by capturing an image of the user without the glasses. The glasses include a position determination marker at a predetermined position and has a predetermined color (color pattern) at a predetermined position. The computer system determines the color of each position of the face of the user based on the first image data and the second image data using the marker and the color.

5 Claims, 24 Drawing Sheets

(51) Int. Cl.
*G01J 3/46* (2006.01)
*G06T 7/90* (2017.01)
*G06V 10/60* (2022.01)
*G06V 40/16* (2022.01)

(52) U.S. Cl.
CPC ............ *G06V 10/60* (2022.01); *G06V 40/161* (2022.01); *G06V 40/171* (2022.01); *A45D 2044/007* (2013.01); *G06T 2207/30201* (2013.01)

(56) References Cited

U.S. PATENT DOCUMENTS

| | | |
|---|---|---|
| 2003/0063794 A1 | 4/2003 | Rubinstenn et al. |
| 2007/0058858 A1* | 3/2007 | Harville ................ G06Q 30/02 382/165 |
| 2012/0327358 A1* | 12/2012 | Iaria ...................... G02C 11/02 351/111 |
| 2014/0267664 A1 | 9/2014 | Gross et al. |
| 2015/0356661 A1 | 12/2015 | Rousay |
| 2018/0003621 A1* | 1/2018 | Drury ................. G01N 21/293 |
| 2018/0197052 A1* | 7/2018 | Yanson ............ G06K 19/06037 |
| 2019/0026540 A1* | 1/2019 | Tahara ................... G06V 10/60 |
| 2019/0197736 A1 | 6/2019 | Sugaya |
| 2020/0020011 A1* | 1/2020 | Harvill ............... G06Q 30/0621 |
| 2020/0043213 A1* | 2/2020 | Bao ..................... G06V 40/193 |
| 2020/0289333 A1* | 9/2020 | Gobet ................... G01J 3/0272 |
| 2021/0181538 A1* | 6/2021 | Han ....................... G06T 17/00 |
| 2021/0345733 A1 | 11/2021 | Maezawa |
| 2021/0375060 A1 | 12/2021 | Maezawa |

FOREIGN PATENT DOCUMENTS

| | | |
|---|---|---|
| EP | 2609731 B1 | 3/2017 |
| JP | 2004-038918 A | 2/2004 |
| JP | 2004-086324 A | 3/2004 |
| JP | 2006-110075 A | 4/2006 |
| JP | 2009-129021 A | 6/2009 |
| JP | 2011-176397 A | 9/2011 |
| JP | 2013-30824 A | 2/2013 |
| JP | 2014-501908 A | 1/2014 |
| JP | 2017-511929 A | 4/2017 |
| JP | 2017-191300 A | 10/2017 |
| JP | 2019-195619 A | 11/2019 |
| WO | 2015/126361 A1 | 8/2015 |
| WO | 2018/008138 A1 | 1/2018 |
| WO | 2018/029963 A1 | 2/2018 |
| WO | 2019/189846 A1 | 10/2019 |

OTHER PUBLICATIONS

Stegner, Elizabeth, "American Teenage Vision and the Value of Cool" (2017). Thesis. Rochester Institute of Technology (Year: 2017).*

Aug. 25, 2023 Office Action issued in Canadian Patent Application No. 3163534.

* cited by examiner

FIG.7

| COLOR PATTERN NAME | READ VALUE | READING COMPLETION FLAG |
|---|---|---|
| CL01 | (Rr1,Gr1,Br1) | 1(SUCCEEDED) |
| CL02 | (Rr2,Gr2,Br2) | 0(FAILED) |
| CL03 | (Rr3,Gr3,Br3) | 1 |
| ⋮ | ⋮ | ⋮ |

GLASSES COLOR READING RESULT DATA

GLASSES, RECOMMENDED COSMETICS PRESENTATION CONTROL SYSTEM, AND RECOMMENDED COSMETICS PRESENTATION CONTROL METHOD

TECHNICAL FIELD

The present invention relates to glasses and so on. The glasses are used when a computer system determines the facial color of the person wearing the glasses.

BACKGROUND ART

For those who wear makeup, especially for ones wear it every day, selecting cosmetics that suit them or cosmetics that enable them to achieve desirable makeup is a daily and important work. Users often select and purchase cosmetics based on, for example, their accumulated knowledge about makeup, information obtained from the Internet, and advice from sales staff at the cosmetics sales counter in stores. Examples of known computer system technologies for selecting cosmetics include the technology of a recommendation system that enables presentation of recommended cosmetics based on the skin color of the user from among the cosmetics registered in the database (see, for example, Patent Literature 1).

CITATION LIST

Patent Literature

Patent Literature 1: Japanese Laid-Open Patent Publication No. 2019-195619

SUMMARY OF INVENTION

Technical Problem

However, to enable a computer system to present recommended cosmetics, it is important to find a method of obtaining correct information of the user's skin color. In the technology of Patent Literature 1, to obtain the skin color of the user, it is necessary to prepare a special lighting environment and special photographic equipment to take a picture of the user. General users may wish to, for example, use the recommended cosmetics presentation service on their own by simply taking a selfie using their own smartphones after they remove the makeup at home. However, it is extremely difficult to do it with the technology of Patent Literature 1.

The object to be achieved by the present invention is to provide a technology for easily and accurately obtaining information of the face color of the user without requiring a specially-controlled lighting environment or special photographic equipment.

Solution to Problem

According to a first aspect of the present invention, there is provided a recommended cosmetics presentation control system, comprising:
  glasses: and
  a computer system,
  the glasses including a position determination marker at a predetermined position and a predetermined color at a predetermined position,
  the computer system comprising:
    an image acquisition section for acquiring first image data obtained by capturing an image of a user wearing the glasses, and second image data obtained by capturing an image of the user without the glasses;
    a determination section for determining a color of each position of a face of the user based on the first image data and the second image data using the marker and the color; and
    a presentation control section for controlling selection of cosmetics to be recommended to the user from a predetermined cosmetics database based on determination results of the determination section, and presentation of the cosmetics to the user.

The "computer system" herein may be implemented not only by a single computer but also by cooperation of a plurality of computers.

The "glasses" herein may be lensless glasses (i.e., plain-glass spectacles).

The glasses have a predetermined color (a color pattern: a standard color for color determination) for determining the color of each position of the face of the user, and a marker for determining the relative position of the predetermined color in the glasses.

In the first image data in which the user is wearing the glasses, the face, which is the target of the color determination, and the color pattern, which is the reference of the color determination, are very close to each other. Also, it can be regarded that the state of the ambient light in the first image data and the state of the ambient light in the second image data are almost the same. This is because the capture of the second image data can be performed continuously from the capture of the first image data after a slight movement of the user to take off the glasses.

Therefore, even in a shooting environment where the user takes a selfie using a smartphone camera at home, the degree of exposure of the ambient light before and after removing the glasses is almost the same, and accurate color reading is possible by performing calibration with the color read from the part having a color pattern and reading face color information from the face part of the image. This makes it possible to achieve a system for easily and accurately obtaining information of the face color of the user without requiring a specially-controlled lighting environment or special photographic equipment. It is also possible to achieve a system that enables presentation of the recommended cosmetics to the user using the color of each position of the face of the user.

The glasses may comprise a frame having the marker and the color.

The "frame" herein means a frame of common glasses and refers to a structure excluding the lenses. For general glasses, examples of the frame include the rim, the bridge, the endpiece, the nose pad, the pad arm, the hinge, the temple, the temple tip, the belt that replaces the hinge, the belt attachment part, and the like.

The first image data may be obtained by capturing an image of the user wearing the glasses at a different face orientation, and
  the determination section may carry out a first shininess correction process with respect to a captured image part of the frame based on an image of the user with a different face orientation included in the first image data, and may determine a color of each position of the face of the user using a color difference between a color of the captured image part of the frame after the first shininess correction process and the color of the frame.

The term "shininess" herein means a relatively-high luminance area generated locally in the object surface or uneven luminance in the captured image due to the refraction, reflection, and diffusion of light on the object surface, which are caused when light hits the surface of an object. Examples thereof include phenomena called highlight and reflection. When the shininess occurs, the original color of the object cannot be read correctly. In a shooting environment where the user takes a selfie using a smartphone camera at home, the ambient light is biased in many cases, and the shininess easily occurs. On the other hand, the presence or absence of the shininess, the location of the shininess, and the degree of the shininess change when the shooting angle is changed.

Accordingly, by performing the first shininess correction process using, as the first image data, multiple data with different face orientations, even if the shininess appears in a part of the first one of the first image data, the recommended cosmetics presentation control system can read the color of the part using another first image data that does not have the shininess in that part.

The second image data may be obtained by capturing an image of the user without the glasses at a different face orientation, and the determination section may carry out a second shininess correction process with respect to each captured image part of the face of the user based on an image of the user with a different face orientation included in the second image data.

The shininess also occurs on the user's skin.

By performing the second shininess correction process using, as the second image data, multiple data with different face orientations, even if the shininess appears in a part of the face in the first one of the second image data, the recommended cosmetics presentation control system can read the color of the part using another second image data that does not have the shininess in that part.

The determination section may determine a color of hair of the user, and the presentation control section may control selection of cosmetics based on the color of the hair determined by the determination section and presentation of the cosmetics.

This enables the recommended cosmetics presentation control system to select and present cosmetics based on both the color of the hair and the colors of the face parts.

The presentation control section may perform a control for selecting a model that satisfies a predetermined matching condition for the determination result of the determination section from a model database, and presenting the cosmetics associated with the model, the model database storing information of cosmetics applied to the model associated with each model.

The model database may store before-makeup model data associating with the model, the before-makeup model data being data of results of the acquisition of image data of the model by the image acquisition section and the determination by the determination section performed with respect to the model before wearing makeup, and the presentation control section may perform a control for selecting a model that satisfies the matching condition for the determination result of the determination section for the user based on the before-makeup model data, and presenting cosmetics associated with the model.

This enables the recommended cosmetics presentation control system to select a model whose face part color matches that of the user from the model database in which a person wearing makeup, i.e., the model, and information of the cosmetics used for the makeup of the model are registered, and select and present the cosmetics related to the makeup of the model. Since the role model is a real person (model) and the cosmetics are selected and presented based on the combination of the cosmetics used for the makeup of the model, it becomes easier for the user to understand. More specifically, it improves user's convenience.

The determination section may include a facial feature amount determination section for determining a facial feature amount regarding a size, a shape, and a position of the face or face parts of the user based on the position of the marker in the captured image, the model database may store data of the facial feature amount of the model while associating the data with the model, and the presentation control section may perform a control for selecting a model having data of the facial feature amount satisfying the matching condition for the determination result of the facial feature amount determination section, and presenting cosmetics associated with the model.

This enables the recommended cosmetics presentation control system to present the cosmetics that were used for the makeup of the model having facial features similar to those of the user. In view of the user, it becomes easier to see how they will look after the makeup with the presented cosmetics. More specifically, it further improves user's convenience.

According to a second aspect of the present invention, there are provided glasses comprising:

a position determination marker provided at a predetermined position; and a color with a predetermined color provided at a predetermined position, the glasses allowing a computer system to determine a color of each position of a face of a user based on first image data obtained by capturing an image of the user wearing the glasses, second image data obtained by capturing an image of the user without the glasses, the marker, and the color.

The "glasses" herein may be lensless glasses (i.e., plain-glass spectacles).

The glasses have a predetermined color (a color pattern: a standard color for color determination) for determining the color of each position of the face of the user, and a marker for determining the relative position of the predetermined color in the glasses.

In the first image data in which the user is wearing the glasses, the face, which is the target of the color determination, and the color pattern, which is the reference of the color determination, are very close to each other. Also, it can be regarded that the state of the ambient light in the first image data and the state of the ambient light in the second image data are almost the same. This is because the capture of the second image data can be performed continuously from the capture of the first image data after a slight movement of the user to take off the glasses.

Therefore, even in a shooting environment where the user takes a selfie using a smartphone camera at home, the degree of exposure of the ambient light before and after removing the glasses is almost the same, and accurate color reading is possible by performing calibration with the color read from the part having a color pattern and reading face color information from the face part of the image. This makes it possible to easily and accurately obtain information of the face color of the user without requiring a specially-controlled lighting environment or special photographic equipment.

The glasses may comprise a frame having the marker and the color.

The "frame" herein means a frame of common glasses and refers to a structure excluding the lenses. For general glasses, examples of the frame include the rim, the bridge, the endpiece, the nose pad, the pad arm, the hinge, the temple, the temple tip, the belt that replaces the hinge, the belt attachment part, and the like.

According to a third aspect of the present invention, there is provided a recommended cosmetics presentation control method executed by a computer system, the method comprising the steps of:

acquiring first image data obtained by capturing an image of the user wearing glasses having a position determination marker at a predetermined position and a predetermined color at a predetermined position, and second image data obtained by capturing an image of the user without the glasses;

determining a color of each position of a face of the user based on the first image data and the second image data using the marker and the color; and controlling selection of cosmetics to be recommended to the user from a predetermined cosmetics database based on determination results of the determination step, and presentation of the cosmetics to the user.

According to this embodiment, it becomes possible to achieve a recommended cosmetics presentation control method that ensures the same effect as that of the first embodiment concerning the computer system described above.

BRIEF DESCRIPTION OF DRAWINGS

FIG. 7 is a diagram illustrating a data configuration example of glasses color reading result data.

DESCRIPTION OF EMBODIMENTS

An embodiment of the present invention is described below. However, it is clear that the mode to which the present invention is applicable is not limited to the following embodiment.

1. First Embodiment

Figure 1:
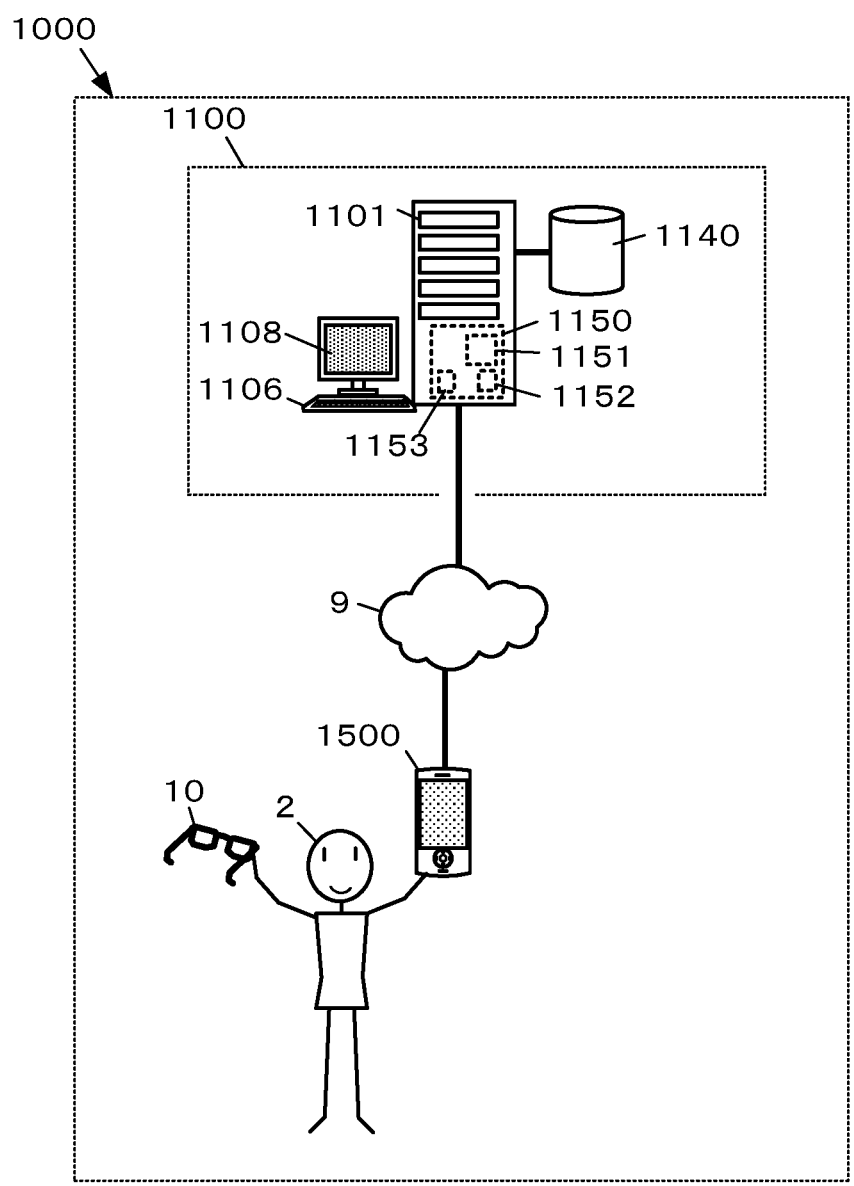
FIG. 1 is a diagram illustrating a configuration example of a recommended cosmetics presentation control system.

FIG. 1 is a diagram illustrating a configuration example of a recommended cosmetics presentation control system.

The recommended cosmetics presentation control system 1000 includes a server system 1100 and a user terminal 1500, which are capable of bidirectional data communication via a network 9. The recommended cosmetics presentation control system 1000 is a computer system that presents, to a user 2 who uses the user terminal 1500 and glasses 10, (1) a recommended cosmetics presentation service for presenting makeup cosmetics (hereinafter simply referred to as "cosmetics") to the user, (2) an online shopping service to enable online purchase of the presented cosmetics, and (3) a social network service (SNS). It is clear that the recommended cosmetics presentation control system 1000 may provide other additional services.

The network 9 is a communication channel that enables data communications. Specifically, the network 9 includes a communication network such as a local area network (LAN) using a private line (a private cable) for direct connection, Ethernet (registered trademark), or the like, a telecommunication network, a cable network, the Internet, and the like. A communication method may be a cable communication method or a wireless communication method.

The server system 1100 includes, for example, a main body device 1101, a keyboard 1106, a touch panel 1108, and a storage 1140, and the main body device 1101 includes a control board 1150.

The control board 1150 includes various microprocessors such as a Central Processing Unit (CPU) 1151, a Graphics Processing Unit (GPU), and a Digital Signal Processor (DSP), various types of IC memory 1152 such as VRAM, RAM, and ROM, and a communication device 1153. The control board 1150 may be entirely or partially implemented by an Application Specific Integrated Circuit (ASIC), a Field-Programmable Gate Array (FPGA), or a System on a Chip (SoC).

The server system 1100 actuates the function of providing the recommended cosmetics presentation service, the online shopping service, and SNS by allowing the control board 1150 to carry out a calculation process based on a predetermined program and data. In providing the services, these functions include providing a program that can be executed in the user terminal 1500, and data of various types required to execute the program.

FIG. 1 illustrates only one user terminal 1500, however, a plurality of user terminals 1500 can simultaneously access the server system 1100 in an actual system operation.

FIG. 1 also illustrates the server system 1100 including only one server device, however, the server system 1100 may be implemented by a plurality of devices. For example, the server system 1100 may be configured such that a plurality of blade servers are connected together via an internal bus in a data communicable manner to share the functions. Further, the place where the hardware constituting the server system 1100 is installed is not limited. The server system 1100 may be configured such that a plurality of independent servers installed at distant places perform data communication via the network 9 to thereby function as a server system 1100 as a whole.

Figure 2:
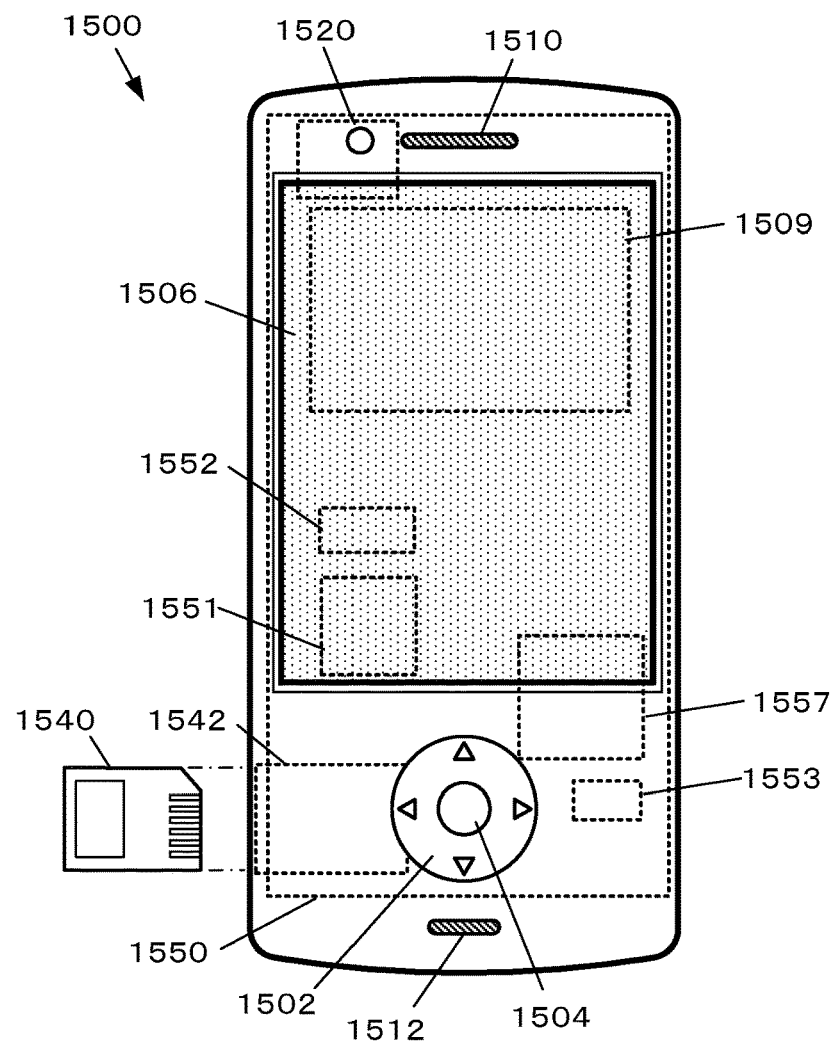
FIG. 2 is a front view illustrating a configuration example of a user terminal.

FIG. 2 is a front view illustrating a configuration example of the user terminal 1500.

The user terminal 1500 is a computer system that is used by a registered user so as to use the recommended cosmetics presentation control system 1000 according to the present embodiment, and is an electronic apparatus (an electronic device) that can access the server system 1100 via the network 9. The user terminal 1500 is generally a device known as a smartphone. The user terminal 1500 may also be a wearable computer such as a smartwatch, a portable game device, a tablet computer, a personal computer, or the like. If a plurality of electronic devices, such as a smartphone and a smart watch that is communicably connected to the smartphone, are organically connected to each other to perform a single function, the plurality of electronic devices can be regarded as a single user terminal 1500.

The user terminal 1500 includes an arrow key 1502, a button switch 1504, a touch panel 1506 functioning as an image display device and a touch position input device, a built-in battery 1509, a speaker 1510, a microphone 1512, a camera 1520, a control board 1550, and a memory card reader 1542 capable of writing and reading data on and from a memory card 1540 that is a computer readable storage medium. The user terminal 1500 also includes a power button, a volume control button, and the like (not illustrated). Furthermore, the user terminal 1500 may include an IC card reader or the like capable of contactless writing and reading of data on and from an IC card, such as a credit card or a prepaid card, that can be used to pay the charge for the use of the recommended cosmetics presentation control system 1000 or the like.

The camera 1520 can be implemented by an image sensor module.

The control board 1550 includes (1) a microprocessor of various types (e.g., a CPU 1551, a GPU, or a DSP), (2) an IC memory 1552 of various types (e.g., a VRAM, a RAM, and a ROM), (3) a wireless communication module 1553 for performing wireless communication with a mobile phone base station, a wireless LAN base station, or the like connected to the network 9, (4) an interface circuit 1557, and the like.

The interface circuit 1557 includes (1) circuits such as a driver circuit that drives the touch panel 1506, a circuit that receives signals from the arrow key 1502 and the button switch 1504, (2) an output amplifier circuit that outputs sound signals to the speaker 1510, (3) an input signal generation circuit that generates signals corresponding to the sound collected by the microphone 1512, (4) a circuit for inputting image data of an image captured by the camera 1520, (5) a signal input-output circuit that inputs and outputs signals to and from the memory card reader 1542, and the like.

These elements mounted on the control board 1550 are electrically connected with each other via a bus circuit or the like to be capable of exchanging data and signals. The control board 1550 may partially or entirely be implemented by an ASIC, a FPGA, or a SoC. The control board 1550 stores programs and various types of data for implementing a function of the user terminal in the IC memory 1552.

The user terminal 1500 may be configured to download programs and various types of setting data from the server system 1100 in the present embodiment. Alternatively, the user terminal 1500 may be configured to read the programs and the data from a storage medium such as a memory card 1540 separately provided.

Figure 3:
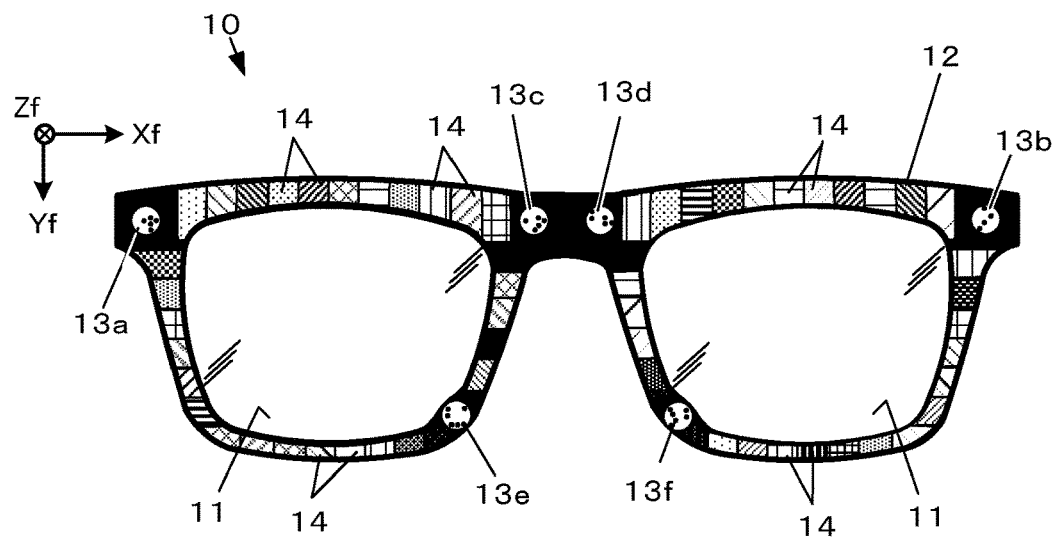
FIG. 3 is a front view of glasses.

FIG. 3 is a front view of the glasses 10. Although the temple and the temple tip are present, they are hidden behind the rim and are not shown.

The glasses 10 include a light-transmissive section 11 and a frame 12.

The light-transmissive section 11 may be a lens, a light-transmissive material incapable of eyesight adjustment, or just a space. If the light-transmissive section 11 is just a space, the glasses 10 is lensless glasses (plain-glass spectacles).

The frame 12 is a portion forming the outer periphery of the light-transmissive section 11. The parts corresponding to the rim, the bridge, the endpiece, and the nose pad in the configuration of general eyesight adjustment glasses with two lenses correspond to the frame 12. If the glasses 10 is rimless glasses, the outer periphery of the light-transmissive section 11 is regarded as the frame 12.

The frame 12 has at least two markers 13 (13a, 13b, ...) in the front. In the example of FIG. 3, the upper left end and upper right end of the frame 12 have a first marker 13a and a second marker 13b, respectively. Further, the frame 12 has a third marker 13c and a fourth marker 13d on the left and right sides of the bridge, and a fifth marker 13e and a sixth marker 13f on the left and right sides of the nose pad section.

Each marker 13 (13a, 13b, ...) has a unique pattern and a predetermined size that are individually recognized by image recognition, and is provided on the frame 12 by painting or printing. The markers 13 are arranged according to a predetermined geometrical positional relationship. The markers 13 may also be stickers and are provided by being attached.

Each marker 13 is used as a reference point for determining a geometrical positional relationship, for example, in determining the positions and the distances upon the recognition of an image obtained by capturing an image of the glasses 10. Each marker 13 is also used as a reference point for determining the orientation of the glasses 10 and the posture.

For example, the sizes of the first marker 13a to the sixth marker 13f and the actual distance between them are set to predetermined values. Therefore, the inclination of the glasses 10 with respect to the camera optical axis (the depth direction of the captured image), the distance to the glasses 10 from the camera, the sizes of the glasses 10 and the object in the image can be geometrically determined from the size of the marker 13 in the captured image and the image coordinate system distance between the markers. In addition, the inclination of the glasses 10 can be determined from the size and the distortion of the markers 13 in the captured image and the positional relationship between the markers 13.

The frame 12 has a plurality of color patterns 14 in which predetermined colors are arranged in predetermined positions.

Specifically, the frame 12 includes, as a material, a black celluloid, and is divided into a plurality of substantially rectangular areas along the rim, thereby forming a plurality of color patterns 14. However, the positional relationship and the shapes of the divided regions are determined in advance. The coloring of the color patterns 14 can be performed, for example, by printing or by attaching a sticker. The coloring may also be performed by integral molding of color resins. In the example of FIG. 3, the difference in color is expressed by the difference in hatching pattern.

In addition to the design shown in FIG. 3, multiple types of glasses 10 can be used, and the respective types can be identified by using a combination of the markers 13. This enables the user 2 to select a favorite design of the glasses 10.

Figure 4:
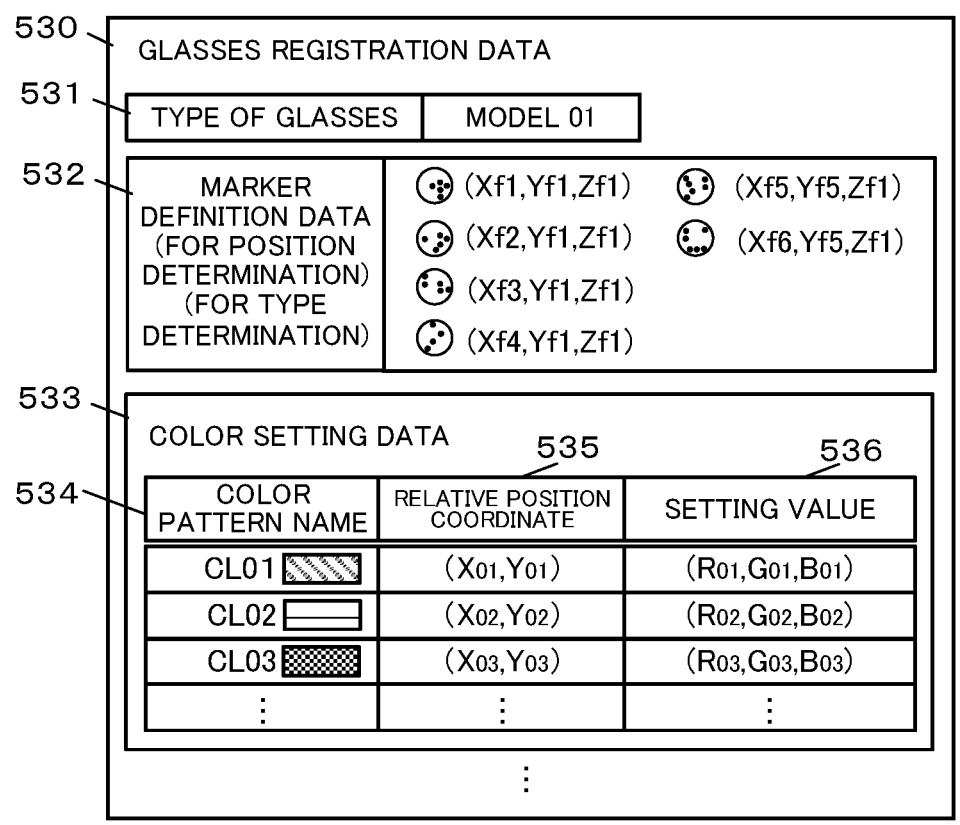
FIG. 4 is a diagram illustrating a data configuration example of glasses registration data.

FIG. 4 is a diagram illustrating a data configuration example of glasses registration data 530.

The glasses registration data 530 is prepared for each type of the glasses 10 and stores various types of information associated with each type of the glasses 10, and is stored in the server system 1100. The glasses registration data 530 include a unique glasses type 531, marker definition data 532, and color setting data 533. It is clear that other kinds of data may also be included as appropriate.

The marker definition data 532 stores data that define the types of marker of the glasses 10 and the relative positional relationship of the markers associated with the registration data. Specifically, for each marker 13, the data (shown as the marks in FIG. 4) playing a role of so-called dictionary data that is used for image recognition of the marker and the position coordinate values of the captured image in the image coordinate system are stored while being associated with each other. Since the marker 13 is a reference for position determination and also serves as information for the determination of the type of glasses, the marker definition data 532 can be expressed as data for position determination and type determination.

The image coordinate system of the captured image can be set as appropriate, for example, as follows. More specifically, it is assumed herein that the markers are arranged in a straight line as follows: the first marker 13a→the third marker 13c→the fourth marker 13d→the second marker 13b, and that the straight line passing through these four markers is parallel with the X-axis (Xf in FIG. 4) of the image coordinate system of the captured image. Further, the side having the fifth marker 13e and the sixth marker 13f with respect to the X-axis (Xf) of the image coordinate system is set as the Y-axis of the image coordinate system (Yf in FIG. 4). Then, the Z-axis is set as the right-side coordinate system based on these two axes.

The color setting data 533 stores, for each color pattern 14, a color pattern name 534, a relative position coordinate 535 in the image coordinate system, and a setting value 536 (RGB value) that defines the color of the color pattern in association with each other. The color indicated by the setting value 536 serves as the standard color for color calibration.

A recommended cosmetics presentation service is described below.

The service is provided by automatically reading the color of each position of the face of the user 2 from the face image of the user 2 captured by the user terminal 1500 (to determine the color), carrying out automatic search for cosmetics, and presenting the results to the user.

Figure 5:
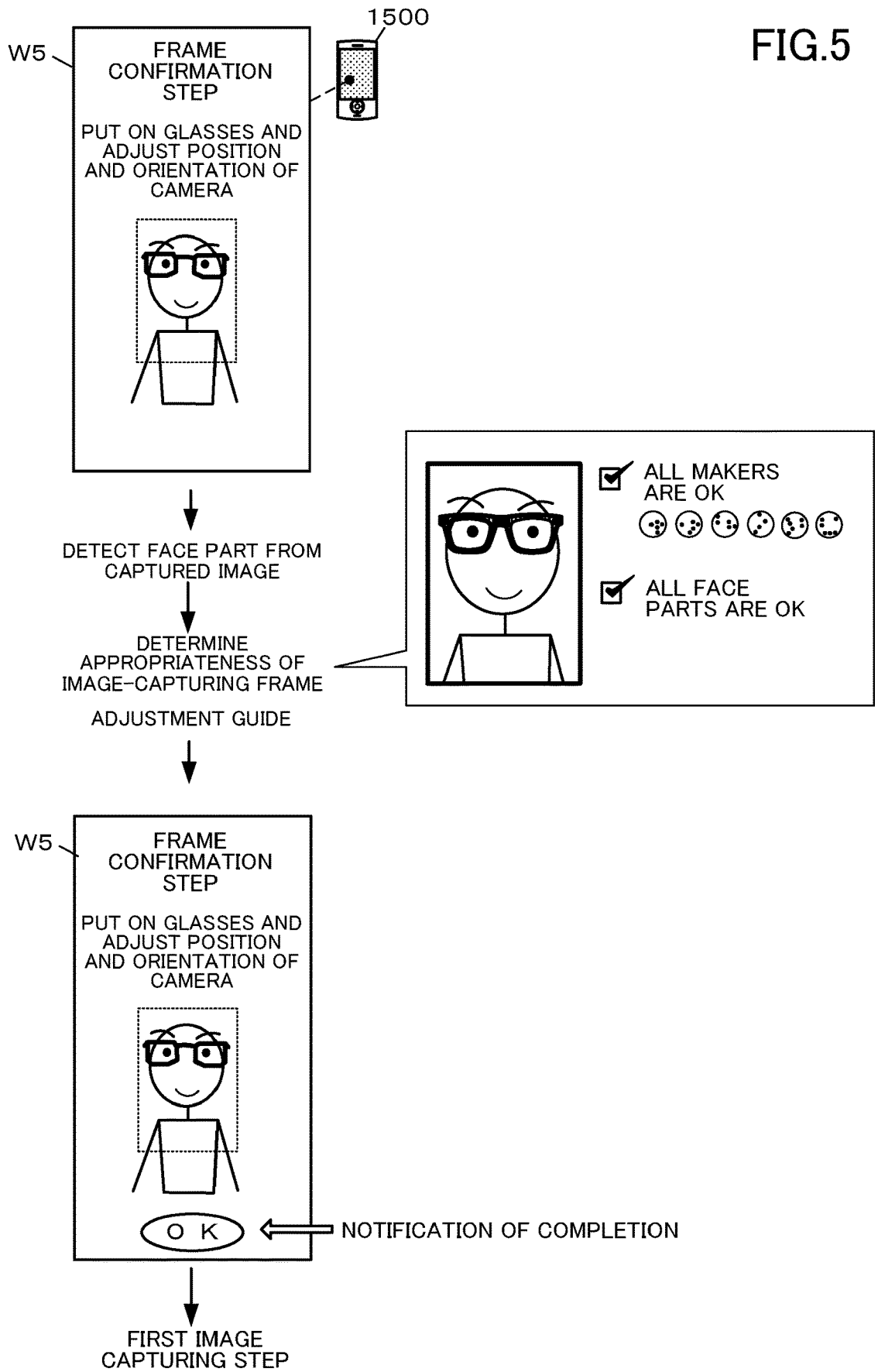
FIG. 5 is a diagram for describing a recommended cosmetics presentation service (1).

When the user 2 inputs the operation to start a predetermined recommended cosmetics presentation service in the user terminal 1500, a frame confirmation screen W5 is displayed in the user terminal 1500, as shown in FIG. 5.

The user terminal 1500 keeps sending image data captured by the camera 1520 to the server system 1100 while the frame confirmation screen W5 is displayed. The server system 1100 performs an image recognition process with respect to the image data and detects the face part and the marker 13. Then, the server system 1100 determines the appropriateness of the image-capturing frame from the detection result. Specifically, when all of the markers 13 and predetermined face parts (for example, the hair, the both eyebrows, the both eyes, the nose, the mouth, the both ears) are recognized, it is determined that the image-capturing frame is appropriate.

If the recognition of the markers or the face parts failed, the server system 1100 requests the user to adjust the distance between the user terminal 1500 and the user 2, or displays an adjustment guide for adjusting the zoom in the user terminal 1500. If the server system 1100 determines that the image-capturing frame is appropriate, the user terminal 1500 displays a predetermined completion notification and carries out a process concerning the acquisition of the first image data (a first image capturing step in FIG. 5).

Figure 6:
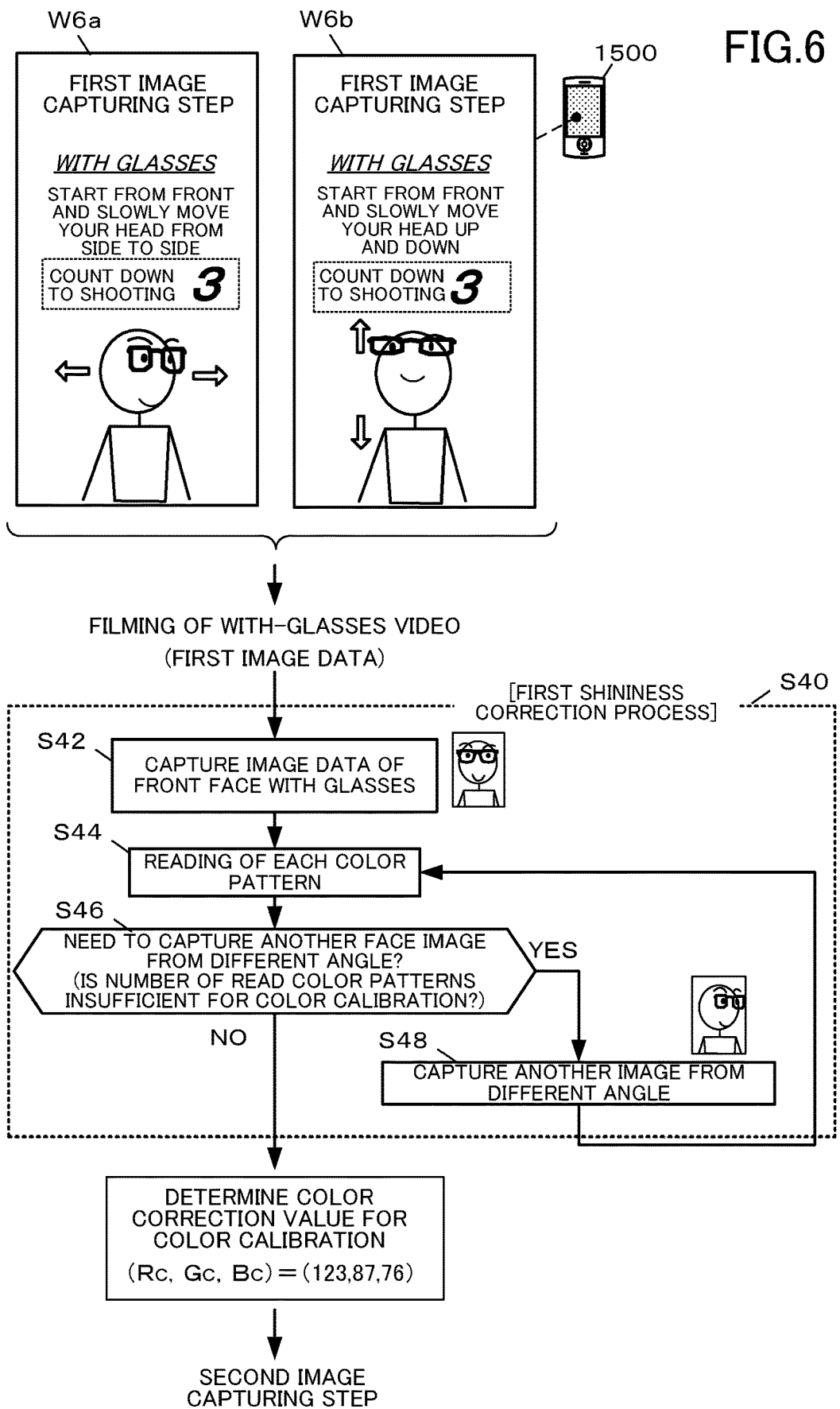
FIG. 6 is a diagram for describing a recommended cosmetics presentation service (2).

As shown in FIG. 6, the process concerning the acquisition of the first image data includes various processes related to the acquisition and storage of the image of the user 2 wearing the glasses 10 required for color calibration.

Specifically, first image capturing screens W6a and W6b are displayed in the user terminal 1500. In the first image capturing screens W6a and W6b, the user 2 is asked to wear the glasses 10 and swing the head left and right toward the user terminal 1500, and is also asked to swing the head up and down with the glasses 10 on. Then, a video of these movements is taken after a predetermined countdown. The "with-glasses video" thus filmed is used as a material for color calibration.

After the "with-glasses video" has been filmed, the server system 1100 carries out a first shininess correction process (step S40). In this process, the server system 1100 captures an "image of the front face with glasses" from the "with-glasses video" (step S42) and reads the color of each color pattern 14 from the captured face image (step S44). The reading of each color pattern 14 is performed by determining the glasses type 531 from the marker 13 shown in the image and determining the color of the pixel indicated by the relative position coordinate 535 of the color setting data 533 of the corresponding type.

The read results are stored in the server system 1100 as glasses color reading result data 720, for example, as shown in FIG. 7. The glasses color reading result data 720 stores, for each color pattern name 721, a read value 722, which is information of the read color, and a reading completion flag 723 while associating them with each other.

The reading completion flag 723 is set to "1" when the reading is appropriately performed to be used as the standard color for color calibration. The determination as to whether it is "appropriate as a standard color for color calibration" is performed according to whether or not shininess 4 occurs in the color pattern 14.

The term "shininess" used herein means a relatively-high luminance area generated locally in the object surface or uneven luminance due to the refraction, reflection, and diffusion of light on the object surface, which are caused when light hits the surface of an object. Examples thereof include phenomena called highlight and reflection. When the shininess 4 occurs, the original color of the object cannot be read correctly. In a shooting environment where the user takes a selfie using a smartphone camera at home, the ambient light is biased in many cases, and the shininess 4 easily occurs. On the other hand, the presence or absence of the shininess 4, the location of the shininess, and the degree of the shininess 4 change when the shooting angle is changed.

Figure 8:
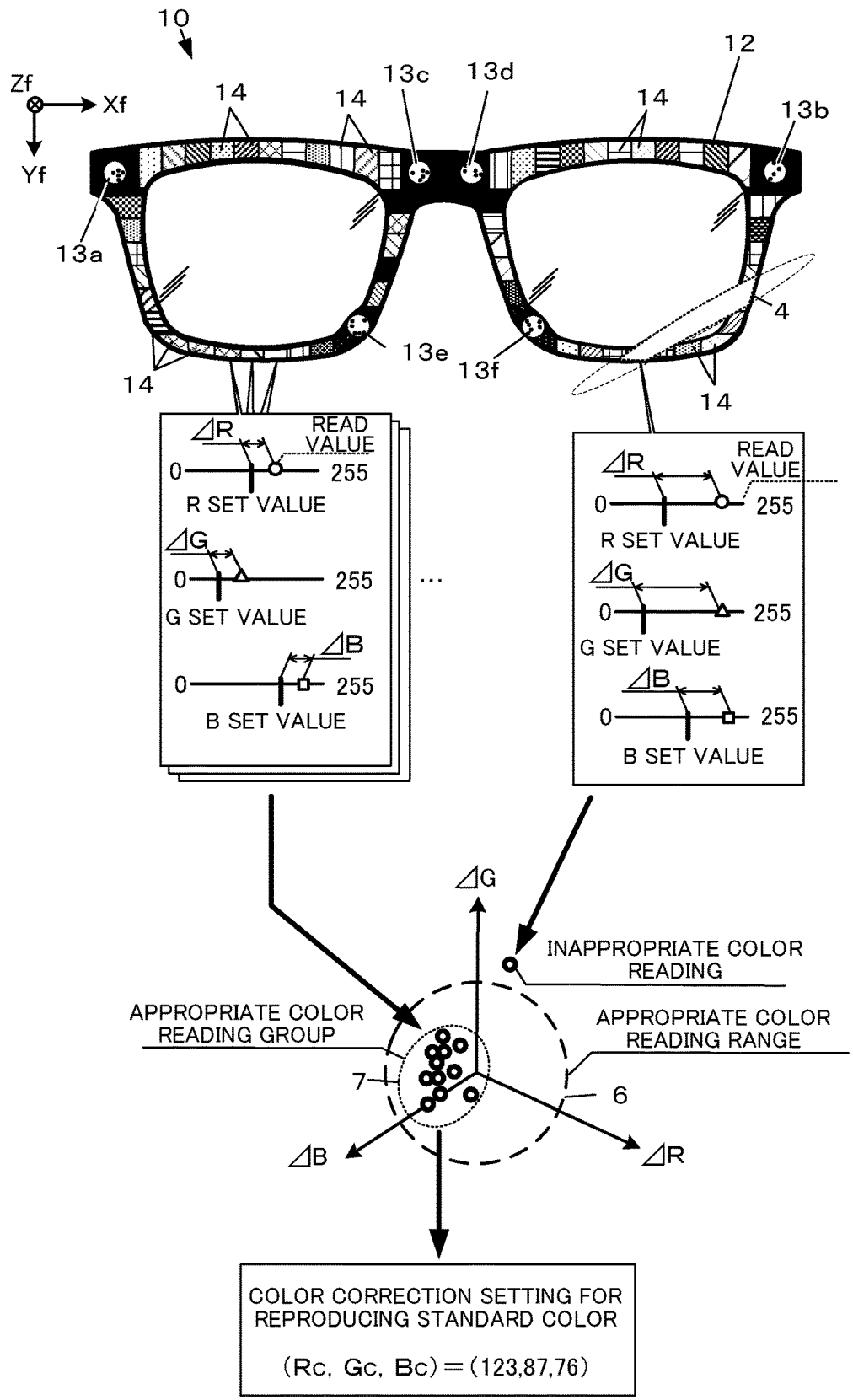
FIG. 8 is a diagram for describing shininess determination.

Specifically, as shown in FIG. 8, when the server system 1100 reads all colors of the color pattern 14, luminance differences $\Delta R$, $\Delta G$, and $\Delta B$ of each RGB component between the setting value 536 (see FIG. 4) and the read value 722 (see FIG. 7) for each color pattern 14 are determined and plotted in a triaxial coordinate system in which each of them serves as the axis component (the white circles in the graph represent the plots).

The luminance difference of the color pattern 14 having the shininess 4 is higher than that of the other color pattern 14 without the shininess (appropriate color reading group 7); that is, a significant luminance difference is observed between them. Therefore, it is possible to identify a color pattern 14 for which color reading cannot be properly performed due to the generation of the shininess 4. It is also possible to set an appropriate color reading suitable range 6 for the luminance difference and determine a color pattern 14 having the luminance differences $\Delta R$, $\Delta G$, and $\Delta B$ that fall out of the range as a color pattern having the shininess 4.

Referring back to FIG. 6, if the color reading from the "image of the front face with glasses" is completed, the server system 1100 determines whether it is necessary to capture another face image from the video from a different angle (step S46). The determination is made according to whether a predetermined number of color patterns 14 is read from, for example, the "image of the front face with glasses", or whether all color patterns 14 have been read.

If the determination is affirmative (YES in step S46), the server system 1100 captures a still image (non-front face image) from the "with-glasses video" from a different angle (step S48), and reads a color of a color pattern 14 that has not been properly recognized (step S44).

If it is not necessary to capture a face image from the video from a different angle (NO in step S46), that is, if the color pattern 14 has been adequately read to be used as a standard color for color calibration, the server system 1100 finishes the first shininess correction process and determines the color correction value for color calibration that matches the read value 722 of the color pattern 14 with each setting value 536 or closely approximates them to be used as the color correction setting. In the example of FIG. 6, the color correction setting is a set of RGB values; however, the color correction setting is not limited to the one using a set of values for the entire image. For example, the color correction value may be set for each part of the face or each region set in the face (for example, left, center, right, etc. in view of the front face).

Further, after the color correction setting is determined, the server system 1100 carries out a process concerning the acquisition of the second image data (a second image capturing step in FIG. 6).

Figure 9:
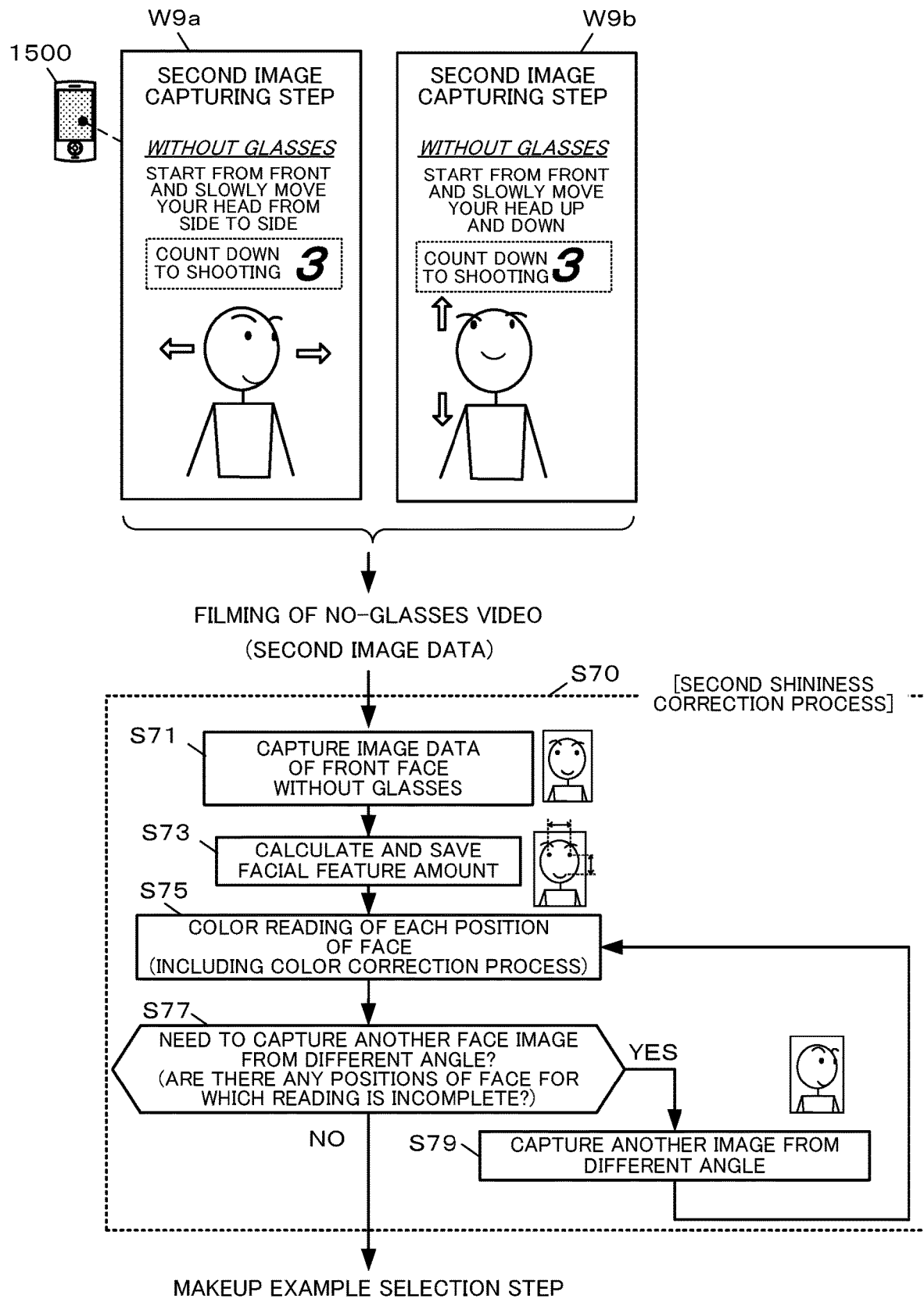
FIG. 9 is a diagram for describing a recommended cosmetics presentation service (3).

FIG. 9 is a diagram for describing a process concerning acquisition of the second image data.

The process relates to the acquisition and storage of the image of the user 2 without the glasses 10. Specifically, second image capturing screens W9*a* and W9*b* are displayed in the user terminal 1500. In the second image capturing screens W9*a* and W9*b*, the user 2 without the glasses 10 is asked to swing the head left and right toward the user terminal 1500, and is also asked to swing the head up and down with no glasses 10 on. Then, a video of these movements is taken after a predetermined countdown. The "no-glasses video" thus filmed serves as the material for reading the color (determining the color) of each position of the face of the user 2.

After the "no-glasses video" has been filmed, the server system 1100 carries out a second shininess correction process (step S70). In this process, the server system 1100 captures an "image of the front face without glasses" from the "no-glasses video" (step S71). The server system 1100 then calculates the facial feature amount of the user 2 (step S73) and reads the color of each of the predetermined parts of the face (step S75).

The color reading position is a relative position determined in advance from a facial feature point or a predetermined range around the relative position. Upon the color reading, the color correction setting set in advance is applied. Specifically, the color is read after the color correction setting is applied to the image to be read, or the color correction setting is applied to the read color.

Figure 10:
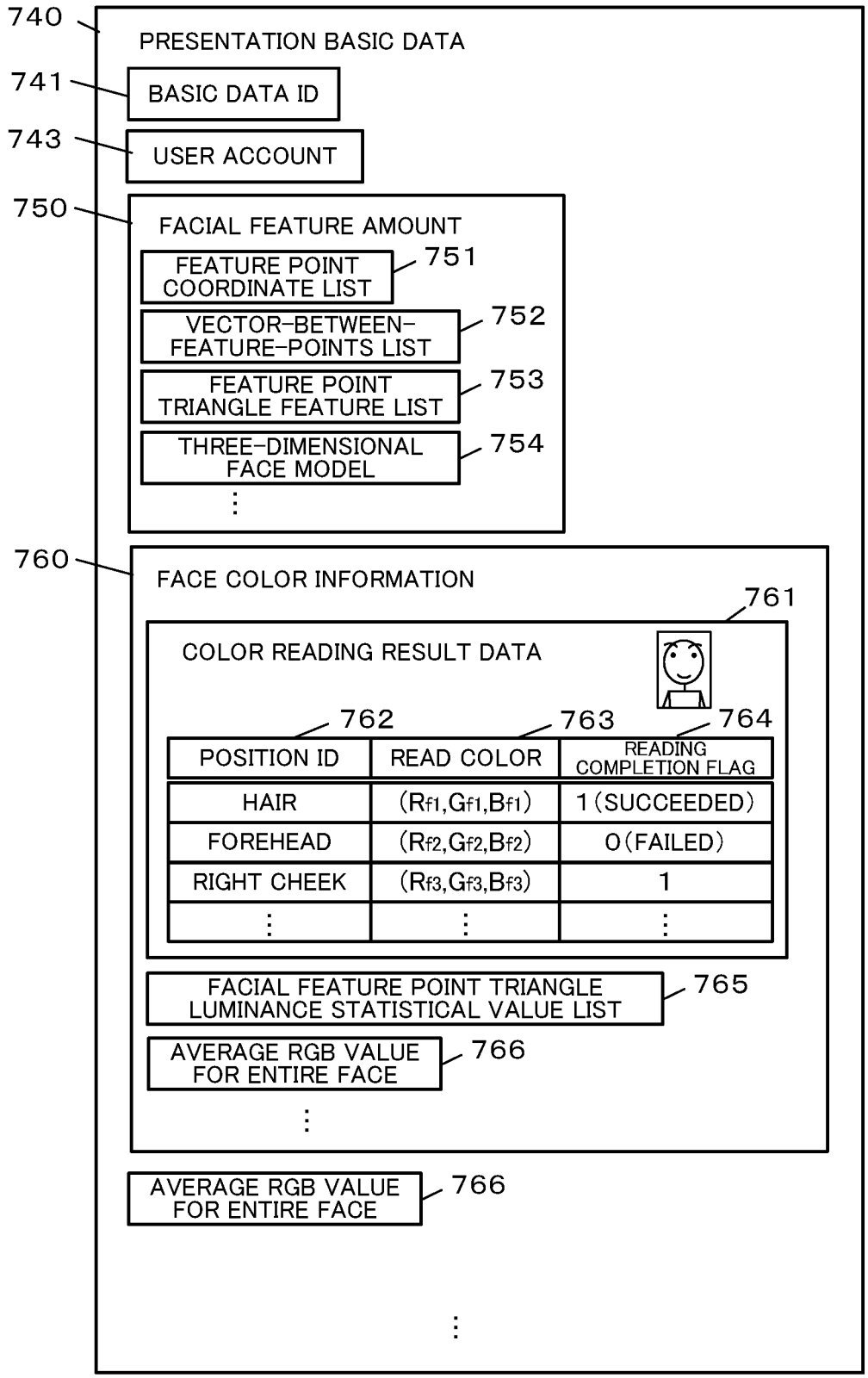
FIG. 10 is a diagram illustrating a data configuration example of presentation basic data.

The information read from the face image (second image data) of the user who is not wearing glasses is stored as presentation basic data 740, for example, as shown in FIG. 10. The presentation basic data 740 includes a unique basic data ID 741, a user account 743, a facial feature amount 750, and face color information 760. It is clear that other kinds of data may also be included as appropriate.

The facial feature amount 750 is information for classifying the "facial configuration" and "facial feature" of the user 2 and determining the similarity. For example, a feature point coordinate list 751 as a list of the feature points of face parts in a predetermined order, a vector-between-feature-points list 752, a feature point triangle feature list 753, a 3D face model 754, and the like can be used as the facial feature amount 750. From the data, it is possible to obtain the sizes and the shapes of the face and the face parts of the user 2, as well as the positional relationship and the relative ratios of the face parts in the entire face, and the like as necessary. Any information can be selected to be used as the facial feature amount 750 according to the algorithm used for the classification and the determination of facial similarity.

The face color information 760 stores the color information of the face read from the captured face image of the user 2. For example, the face color information 760 includes a read position ID 762, a read color 763 (determined color) read from the position, and a reading completion flag 764.

The initial value of the reading completion flag 764 is 0 (meaning that the reading is incomplete). When the color reading (color determination) is performed in a state where shininess does not occur at that position, the value is set to 1 (meaning that the reading is completed). The shininess in the color reading in each position of the face can be recognized as a region surrounded by a local luminance rise.

For example, a Laplacian histogram is created using the skin luminance in the position where the color is read and a predetermined vicinity area. Then, if the position is included in the luminance rising region, it is determined that shininess is generated in the position and that proper color reading is not possible. In this case, the reading completion flag 764 keeps the current value "0". If shininess is not generated, the read color is regarded as the correct color, so that the reading completion flag 764 is set to "1". It is clear that other ideas may also be applied to detect shininess.

Referring back to FIG. 9, the server system 1100 determines whether it is necessary to capture another face image from the no-glasses video from a different angle (step S77). The determination is made, for example, according to whether the color reading is completed without generation of shininess in all face parts that are supposed to be read from the "image of the front face without glasses".

If the determination is affirmative (YES in step S77), the server system 1100 captures a still image from the "no-glasses video" from a different angle (step S79), and reads the color of the position of the face that has not been properly recognized using the face image newly captured (step S75).

If it is not necessary to capture a face image from the video from a different angle, the server system 1100 finishes the second shininess correction process and goes to a process concerning the selection of makeup examples by the user (a makeup example selection step in FIG. 9).

In selecting cosmetics, the user looks through multiple categories (e.g., foundation, concealer, blush, lipstick, etc.); however, the choice of the category depends on the user. Further, it is considered preferable in everyday makeup that the foundation matches the skin color of the user; however, it is different when the user wears makeup for dramatic impact. In this case, the user may intentionally select a color different from the skin color. Further, even when the foundation has the same color, the color of, for example, the lipstick, the blush, and the eye shadow, to be selected may be different depending on the desired makeup. Further, some users want to wear makeup by imitating makeups of their favorite cosmetics manufacturer, a favorite model or talent.

Therefore, the recommended cosmetics presentation service uses two recommendation methods: "read-color-based recommendation" aimed at matching the item with the color of the face part, and "model-based recommendation" based on a makeup example of a face model selected by the user. The process concerning the selection of makeup example desired by the user is a process for the latter.

Figure 11:
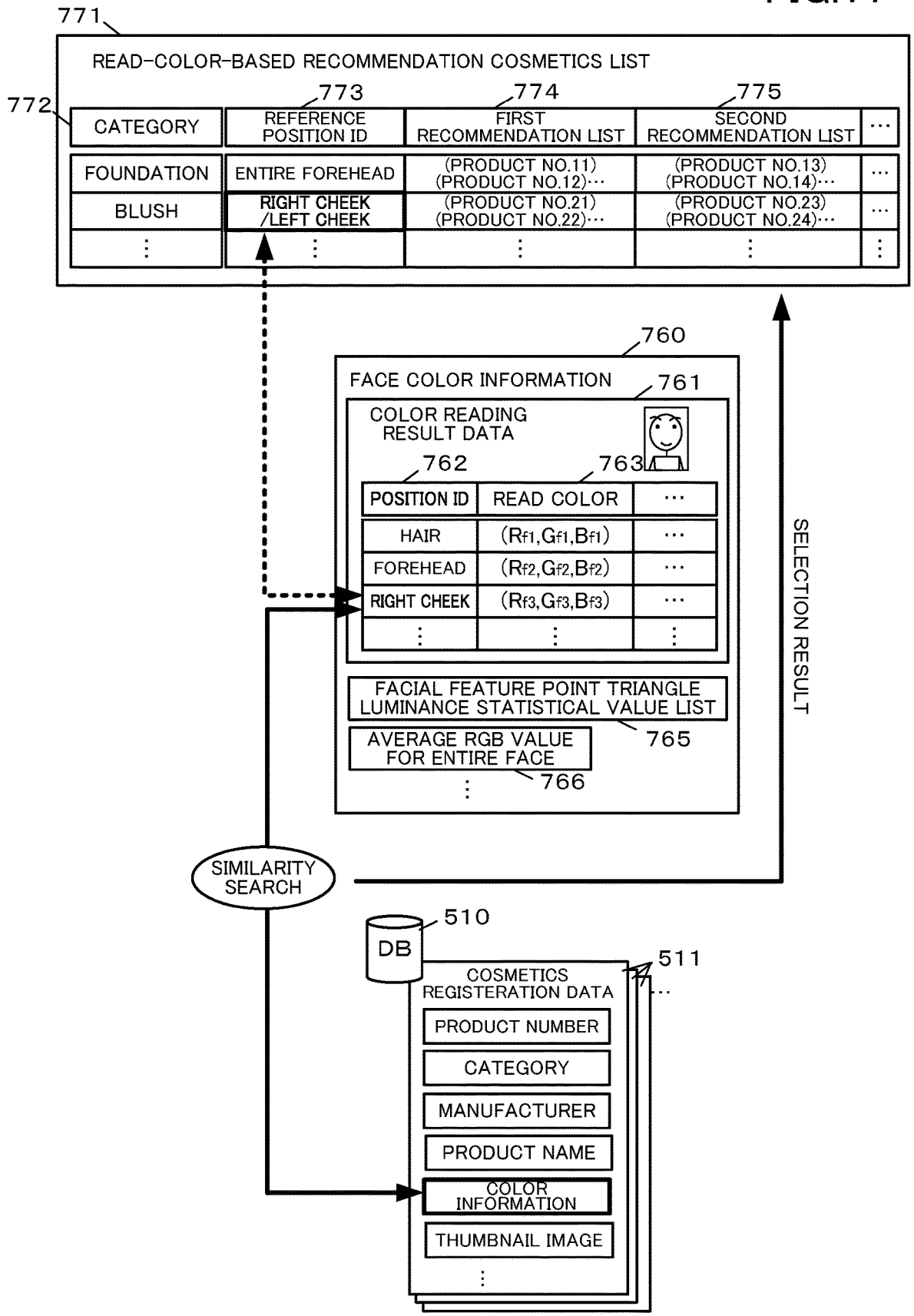
FIG. 11 is a diagram for describing "read-color-based recommendation".

FIG. 11 is a diagram for describing "read-color-based recommendation".

The server system 1100 does not ask user 2 to make a choice such as preference in order to determine the "read-color-based recommendation". The server system 1100 selects first to third recommendations for each cosmetics category. The server system 1100 selects cosmetics with a similar color as the first recommendation from a cosmetics database 510 for the color of each position of the face to which the cosmetics of that category are applied. The server system 1100 selects cosmetics with brighter similar colors, which are brighter than the similar color, as the second recommendation from the cosmetics database 510. The server system 1100 selects cosmetics with darker similar colors, which are darker than the similar color, as the third recommendation from the cosmetics database 510. Then, these first to third recommendations are presented as cosmetics of "read-color-based recommendations".

The "similar colors" referred to herein are not necessarily limited to the most similar colors, and may include similar colors in a certain allowable range. Therefore, they may be colors in a predetermined approximate range. In addition, it is possible to set the "brighter similar colors" and the "darker similar colors" stepwise with a given brightness difference, or select a predetermined number of similar color cosmetics in order of similarity after these cosmetics are found from searching and sorting based on brightness difference.

The similar colors, the brighter similar colors, and the darker similar colors are determined based on the read color 763 corresponding to the target face part previously associated with the category. When the target face part covers a plurality of color reading positions, the statistical value (for example, average value, maximum frequency value, etc.) of the read color 763 of the corresponding face part is determined and used. It is also possible to separately prepare a determination algorithm and follow this algorithm. The target face part may be defined by a feature point triangle, and the similar colors, the brighter similar colors, and the darker similar colors may be determined by referring to a feature point triangle luminance statistical value list 765.

The cosmetics database 510 is managed by the server system 1100. The cosmetics database 510 has cosmetics registration data 511 for each type of cosmetics. A single item of the cosmetics registration data 511 stores various types of information such as the product number, the category, the manufacturer, the product name, and color information.

In the determination of the "read-color-based recommendation", the cosmetics of the target category of various manufacturers are extracted, and cosmetics as the first recommendation, the second recommendation and the third recommendation are selected by a similarity search based on the color information, similar colors, brighter similar colors, and darker similar colors.

The selection results are stored in the server system 1100 as a read-color-based recommendation cosmetics list 771. Specifically, the read-color-based recommendation cosmetics list 771 stores a reference position ID 773 and the individual lists (774, 775, . . . ) of the first to third recommendations for each category 772 while associating them with each other. The reference position ID 773 indicates the position of the face that should be referred to in referring to the read color, and which of the registered cosmetics should be used to determine similarity with the read color, in selecting cosmetics of the target category. The reference position ID 773 is set in advance.

Figure 12:
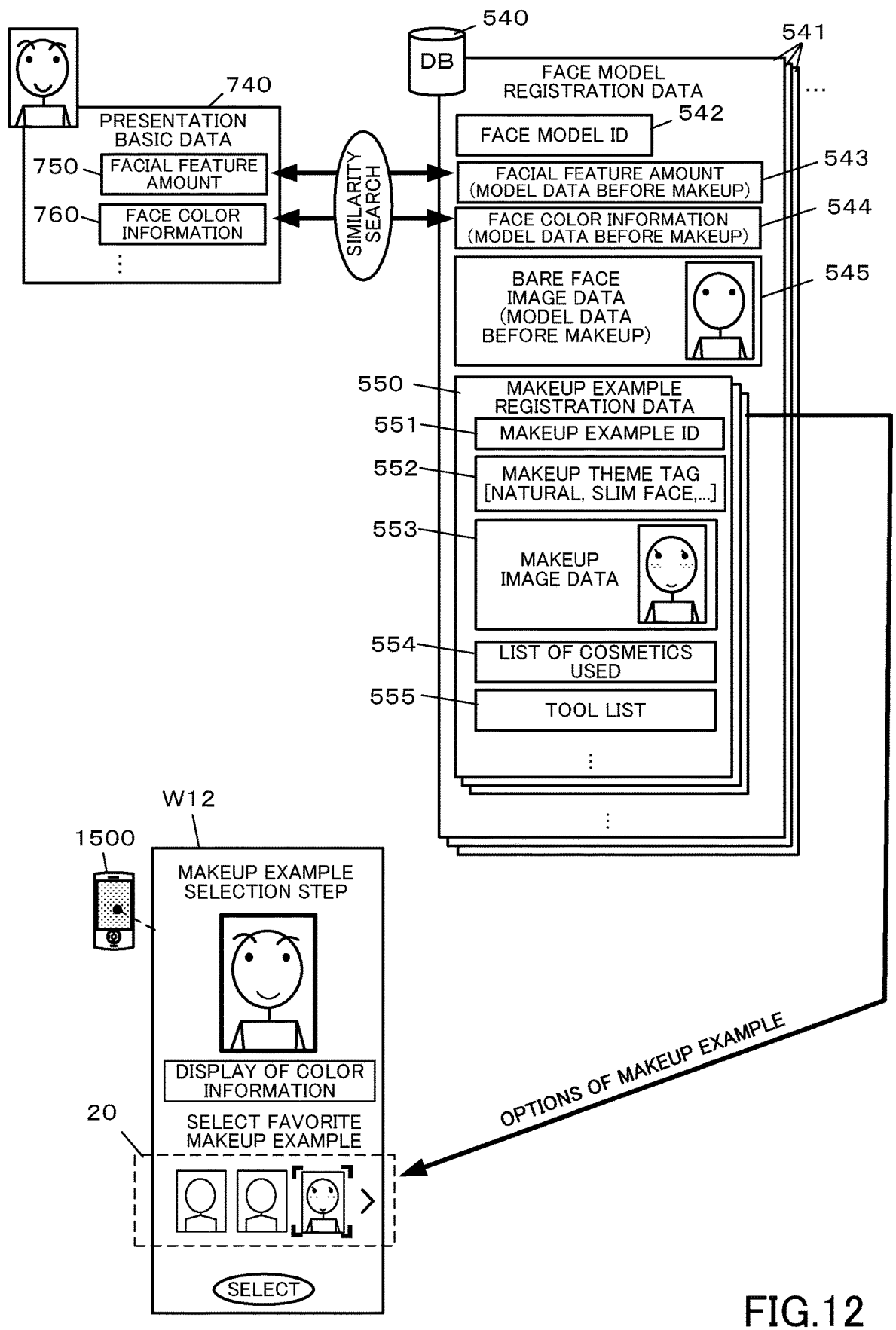
FIG. 12 is a diagram for describing "model-based recommendation".

FIG. 12 is a diagram for describing "model-based recommendation".

The server system 1100 stores and manages a model database 540 having a plurality type of face model registration data 541. The face model registration data 541 is registration data of people who actually wear makeup (face model), and is created for each face model.

A single item of the face model registration data 541 includes a unique face model ID 542, a facial feature amount 543, face color information 544, bare face image data 545, which is a bare face image without makeup and glasses, and a single or multiple items of makeup example registration data 550. It is clear that other kinds of data may also be appropriately included in the face model registration data 541.

The facial feature amount 543 and the face color information 544 are the results of acquisition of a face image (first image data) of the face model before wearing makeup and without glasses and the reading (color determination) of the color of each position of the face. The data may be regarded as "pre-makeup model data".

More specifically, the facial feature amount 543 and the face color information 544 have a data structure similar to the facial feature amount 750 and the face color information 760 of the presentation basic data 740 (see FIG. 10) required for the user 2, and are referred to during the similarity search.

The makeup example registration data 550 is prepared for each type of makeup applied to the face model, and stores various types of information regarding the makeup. A single item of the makeup example registration data 550 includes a unique makeup example ID 551, a makeup theme tag 552, makeup image data 553, a list of cosmetics used 554, and a tool list 555. The makeup theme tag 552 is tag data in which words for the theme and the classification of the makeup are registered. The makeup image data 553 is data of a face image wearing makeup. The list of cosmetics used 554 is data of identification information (for example, product number, name, etc.) of the cosmetics used for the makeup. The tool list 555 is data of identification information of the cosmetic tools and items (for example, special make-up brushes, false eyelashes, etc.) used for the makeup. It is clear that other kinds of data may also be appropriately included in the makeup example registration data 550.

In the selection of recommended cosmetics in relation to "model-based recommendation", the server system 1100 searches for a face model that is similar in face structure and face part color to the user 2.

Specifically, the server system 1100 carries out a similarity search by comparing, for each face model, the facial feature amount 543 and the face color information 544 with the facial feature amount 750 and the face color information 760 of the presentation basic data 740 of the user 2. The number of face models hit in the search can be set as appropriate.

Then, the server system 1100 allows the user 2 to select a favorite makeup from the makeup examples applied to the face model in the user terminal 1500.

Specifically, the server system 1100 displays a preference selection screen W12 in the user terminal 1500, and displays one or more selection operation icons 20 in the screen. Each selection operation icon 20 is associated with each makeup example registration data 550 of the face model that has been found by the similarity search on a one-to-one basis, and the makeup image data 553 is used for the icon image. The selection operation icon 20 may also serve as an enlarged display operation icon for displaying the corresponding makeup image data 553 in a large size in the user terminal 1500.

Figure 13:
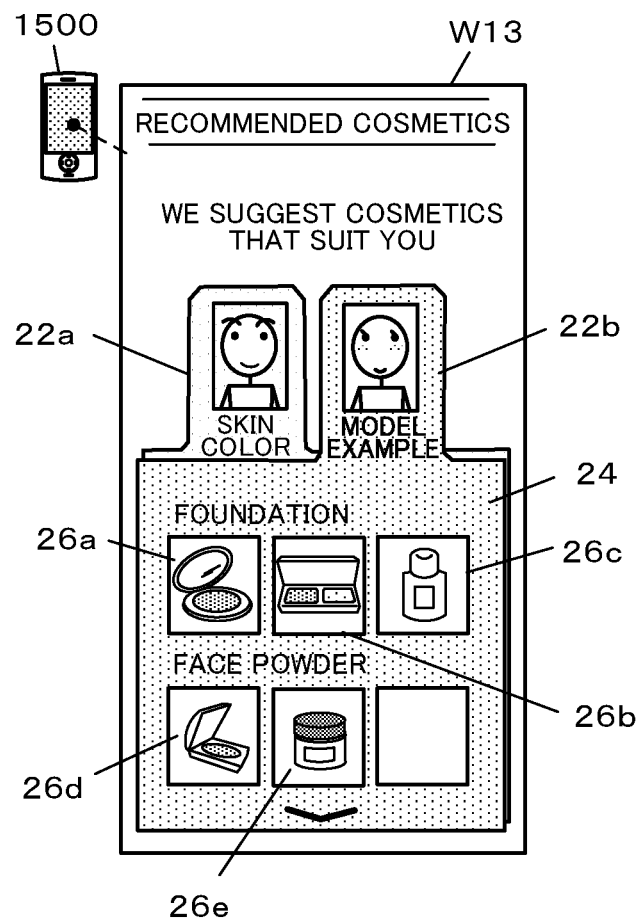
FIG. 13 is a diagram illustrating a display example of presentation screen.

When the server system 1100 obtains the operation information of the selection operation icon 20 by the user 2 from the user terminal 1500, a presentation screen W13 is displayed in the user terminal 1500, for example, as shown in FIG. 13.

In the presentation screen W13, tabs 22 (22a, 22b) individually associated with "read-color-based recommendation" and "model-based recommendation" are provided. The user 2 touches the tab 22 for selection operation, thereby changing the recommended cosmetics criteria. Then, the results of the standard recommendation corresponding to the tab 22 selected at the time is displayed in a recommendation display section 24 while being classified into the categories of cosmetics in the form of cosmetics icon 26 (26a, 26b, . . . ) of each cosmetic type. The cosmetics icon 26 also serves as detailed information of the corresponding cosmetics and as an operation icon for starting purchase procedures.

Specifically, the server system 1100 presents cosmetics, for example, in the first recommendation list 774 or the like of the read-color-based recommendation cosmetics list 771 (see FIG. 11) in the recommendation display section 24 when the tab 22a of the "read-color-based recommendation" is selected.

When the tab 22b for the "model-based recommendation" is selected, the server system 1100 presents cosmetics in the list of cosmetics used 554 of the makeup example of the favorite face model selected in the preference selection screen W12 (see FIG. 12) by the user 2 in the recommendation display section 24. It is also possible to present the tools in the tool list 555 of the makeup example as well.

Subsequently, a functional configuration for enabling such a recommended cosmetics presentation service is described below.

Figure 14:
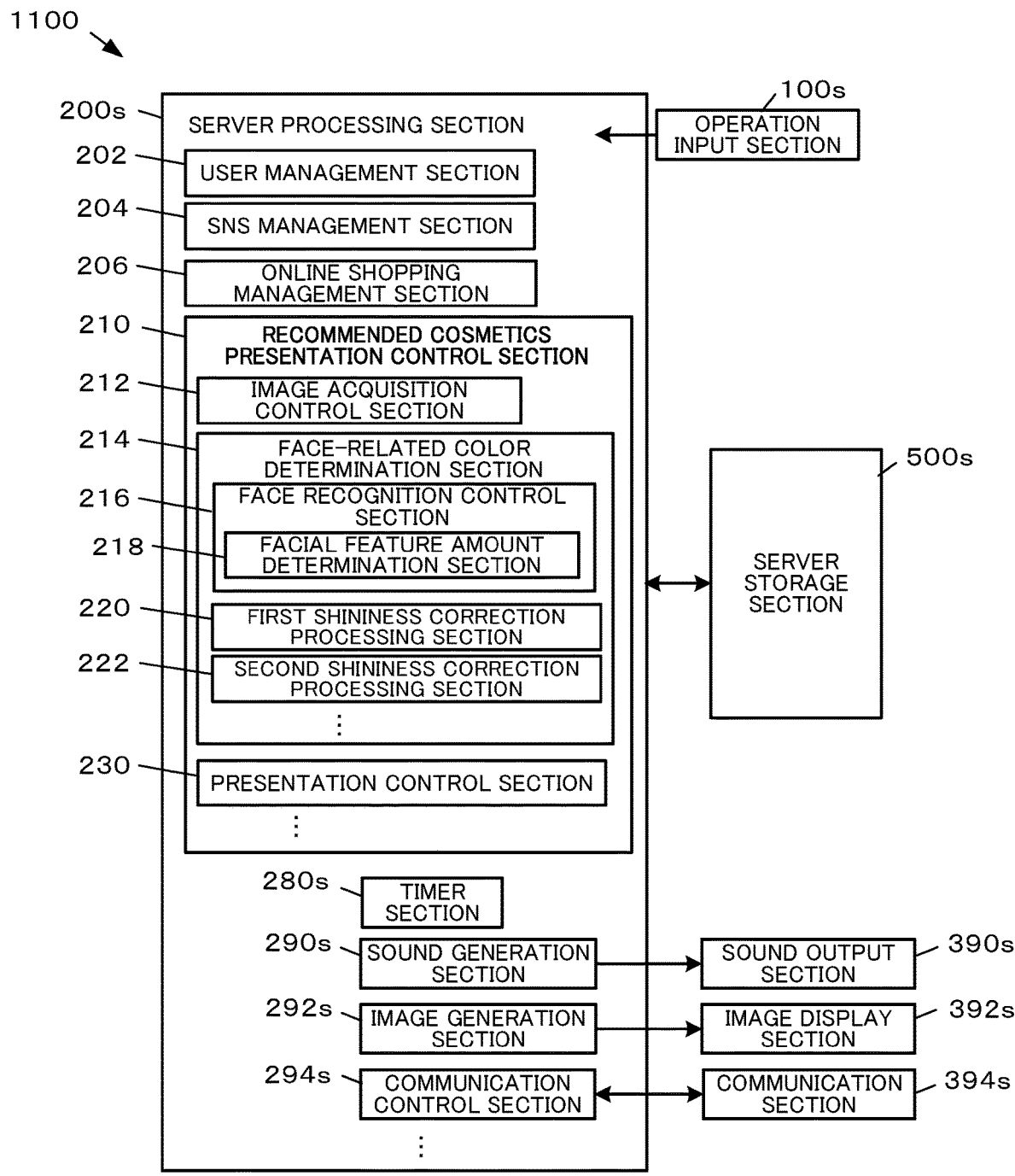
FIG. 14 is a functional block diagram illustrating a functional configuration example of a server system according to a first embodiment.

FIG. 14 is a functional block diagram illustrating a functional configuration example of the server system 1100. The server system 1100 includes an operation input section 100s, a server processing section 200s, a sound output section 390s, an image display section 392s, a communication section 394s, and a server storage section 500s.

The operation input section 100s is a means for inputting various operations for server management. The operation input section 100s corresponds to the keyboard 1106 in FIG. 1.

The server processing section 200s is implemented, for example, by a processor that is a calculation circuit such as a CPU, a GPU, an ASIC, or a FPGA and an electronic component such as an IC memory. The server processing section 200s controls input and output of data between the functional sections including the operation input section 100s and the server storage section 500s. The server processing section 200s performs various calculation processes based on predetermined programs and data, operation input signals from the operation input section 100s, data received from the user terminal 1500, or the like to entirely control the operations of the server system 1100.

The server processing section 200s includes a user management section 202, an SNS management section 204 that performs control regarding SNS, an online shopping management section 206, a recommended cosmetics presentation control section 210, a timer section 280s, a sound generation section 290s, an image generation section 292s, and a communication control section 294s. It is clear that other functional sections may also be included as appropriate.

The user management section 202 performs a process concerning user registration procedures and storage management of various type of information associated with the user account. Specifically, the user management section 202 (1) assigns a unique user account to the registered user, (2) manages registered information by registering and managing personal information for each user account, (3) manages information related to use of SNS (for example, friend registration), (4) manages purchase history of items etc. in online shopping, (5) manages information for electronic payment used in online shopping, and the like. It is clear that other management functions of data associated with the account may also be included as appropriate.

The "information for electronic payment" herein refers to information used for the payment of the price of the service provided by the recommended cosmetics presentation control system 1000 using an electronic payment system. In an electronic payment system using a credit card, a prepaid card, or a membership card, examples of the information for electronic payment include a card number, a password, and the like. Further, if a configuration for making the payment by consuming virtual currency, virtual items, and points that are purchased and registered by the user in advance is used, the information for electronic payment corresponds to the balance of the virtual currency, the virtual items, and the points.

The online shopping management section 206 carries out control of online shopping of various items, such as cosmetics and cosmetic tools.

The recommended cosmetics presentation control section 210 performs various controls concerning the recommended cosmetics presentation service. Specifically, the recommended cosmetics presentation control section 210 includes an image acquisition control section 212, a face-related color determination section 214, and a presentation control section 230.

The image acquisition control section 212 controls the acquisition of the first image data obtained by capturing an image of the user 2 wearing the glasses 10, and the second image data obtained by capturing an image of the user without the glasses 10. The control corresponds to the acquisition of the data of the with-glasses video (see FIG. 6) and the no-glasses video (see FIG. 9) from the user terminal 1500.

The face-related color determination section 214 controls the determination of color of each position of the face of the user based on the first image data and the second image data using the color according to the marker 13 and the color pattern 14. The control corresponds to the reading of the color of each position of the face (see step S75 in FIG. 9).

The face-related color determination section 214 includes a face recognition control section 216, a first shininess correction processing section 220, and a second shininess correction processing section 222.

The face recognition control section 216 controls the recognition of face parts in an image. The face recognition control section 216 also includes a facial feature amount determination section 218 and determines a facial feature amount regarding the size, the shape, and the position of the face or the face parts of the user 2 based on the position of the marker 13 of the glasses 10 in the captured image.

The first shininess correction processing section 220 performs the first shininess correction process with respect to the captured image part of the frame 12 of the glasses 10 based on an image of the user with a different face orientation contained in the first image data (see FIG. 6). The face-related color determination section 214 determines the color of each position of the face of the user using the color difference between the color of the captured image part of the frame after the first shininess correction process, and the color of the frame 12.

The second shininess correction processing section 222 performs the second shininess correction process with respect to each of the captured image parts of the face of the user based on an image of the user with a different face orientation contained in the second image data (see FIG. 9).

The presentation control section 230 controls the selection and presentation of the cosmetics recommended to the user that are selected from the predetermined cosmetics database 510 (see FIG. 11) for each category based on the determination results of the face-related color determination section 214. Since the face-related color determination section 214 determines the color of the hair as one of the colors of the positions of the face, the presentation control section 230 can also be regarded as controlling the selection and presentation of the cosmetics based on the hair color determined by the face-related color determination section 214.

Further, the presentation control section 230 performs a control for selecting a model that satisfies a predetermined matching condition for the determination results of the face-related color determination section 214 from the model database 540 (see FIG. 12) that stores the information of the cosmetics applied to the model associated with each model, and presenting the cosmetics associated with the model. The selection of "the model satisfying the matching condition" corresponds to the similarity search in FIG. 12 performed to search for a model having a facial feature amount and face color information similar to those of the user.

The timer section 280s uses a system clock to measure the current date and time, a limited time period, and the like.

The sound generation section 290s is implemented by execution of an IC or software for generating sound data and decoding, and generates or decodes sound data of operational sounds, sound effects, BGM, and the like upon system management of the server system 1100 or upon the provision of the service. Then, the sound signal related to the system management is output to the sound output section 390s.

The sound output section 390s emits sound signals. In the example in FIG. 1, the sound output section 390s corresponds to a speaker (not illustrated) included in the main body device or the touch panel 1108.

The image generation section 292s generates and synthesizes images, and outputs image signals for displaying them in the image display section 392s. In the present embodiment, this is partly responsible for generating images related to the system management of the server system 1100 or screens related to the various services such as the recommended cosmetics presentation service (or the data for displaying them) in the user terminal 1500.

The image display section 392s is implemented by a device for displaying images, such as a flat panel display, a head-mounted display, or a projector. The image display section 392s corresponds to the touch panel 1108 in the example in FIG. 1.

The communication control section 294s executes data processing concerning the data communication, and performs data exchange with external devices via the communication section 394s.

The communication section 394s is connected to the network 9 to enable the communication. For example, the communication section 394s can be implemented by a transceiver, a modem, a Terminal Adapter (TA), a jack for wired communication cable, a control circuit or the like. The communication section 394s corresponds to the communication device 1153 in the example in FIG.1.

The server storage section 500s stores programs and various types of data for implementing various functions for causing the server processing section 200s to entirely control the server system 1100. The server storage section 500s is also used as a work area for the server processing section 200s, and temporarily stores results of calculations executed by the server processing section 200s in accordance with various programs. This function is implemented by an IC memory such as a RAM or a ROM, a magnetic disc such as a hard disc, an optical disc such as a CD-ROM or a DVD, an online storage, or the like, for example. The server storage section 500s corresponds to the storage media such as the IC memory 1152 and the hard disc included in the main body device and the storage 1140 in the example of FIG. 1.

Figure 15:
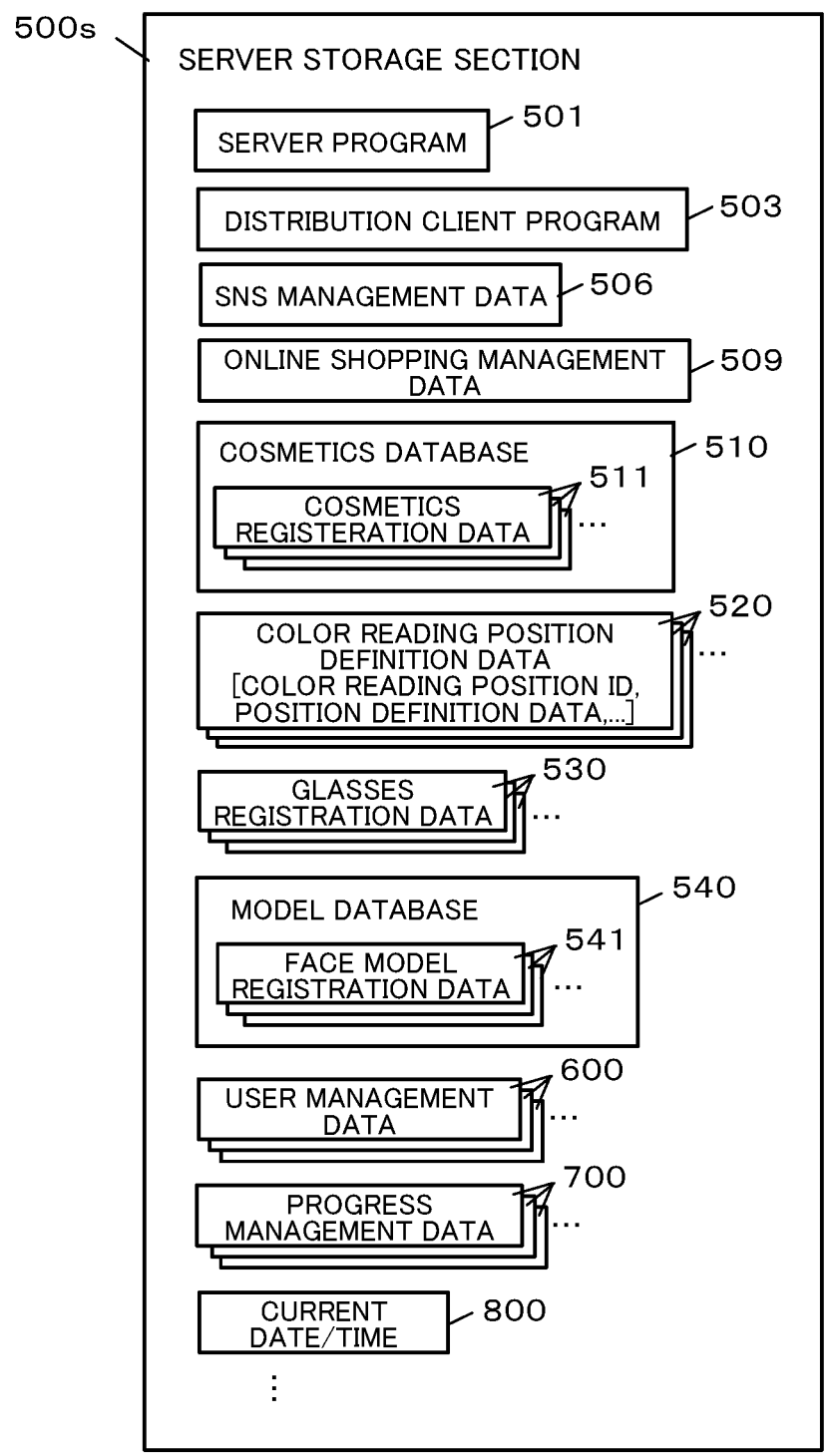
FIG. 15 is a diagram illustrating examples of programs and data stored in a server storage section according to the first embodiment.

FIG. 15 is a diagram illustrating examples of programs and data stored in the server storage section 500s of the present embodiment. The server storage section 500s in the present embodiment stores a server program 501, a distribution client program 503, SNS management data 506, online shopping management data 509, the cosmetics database 510 (see FIG. 11), color reading position definition data 520, the glasses registration data 530 (see FIG. 4), and the model database 540 (see FIG. 12).

The server storage section 500s also stores user management data 600, progress management data 700, and current date/time 800 as the data that is sequentially generated and managed. The server storage section 500s also stores other programs and data (for example, timers, counters, various flags, etc.) as appropriate.

The server program 501 is a program to execute the functions of the user management section 202, the SNS management section 204, the online shopping management section 206, and the recommended cosmetics presentation control section 210 by being read and executed by the server processing section 200s.

The distribution client program 503 is the original of client program provided to the user terminal 1500.

The color reading position definition data 520 is data that specifies the place of the face image of the user 2 to be used for the color reading (color determination), and is provided for each reading position. A single item of the color reading position definition data 520 stores a unique reading position ID and position definition data while associating them with each other. The position definition data is defined in a range of relative position coordinate or a relative position coordinate based on one or more facial feature points. When it is defined by a range, data to specify how to determine the color that represents the range from among the color information corresponding to the range (for example, by taking the average value, by taking the most frequent value, etc.) is also stored in the color reading position definition data 520 as appropriate.

Figure 16:
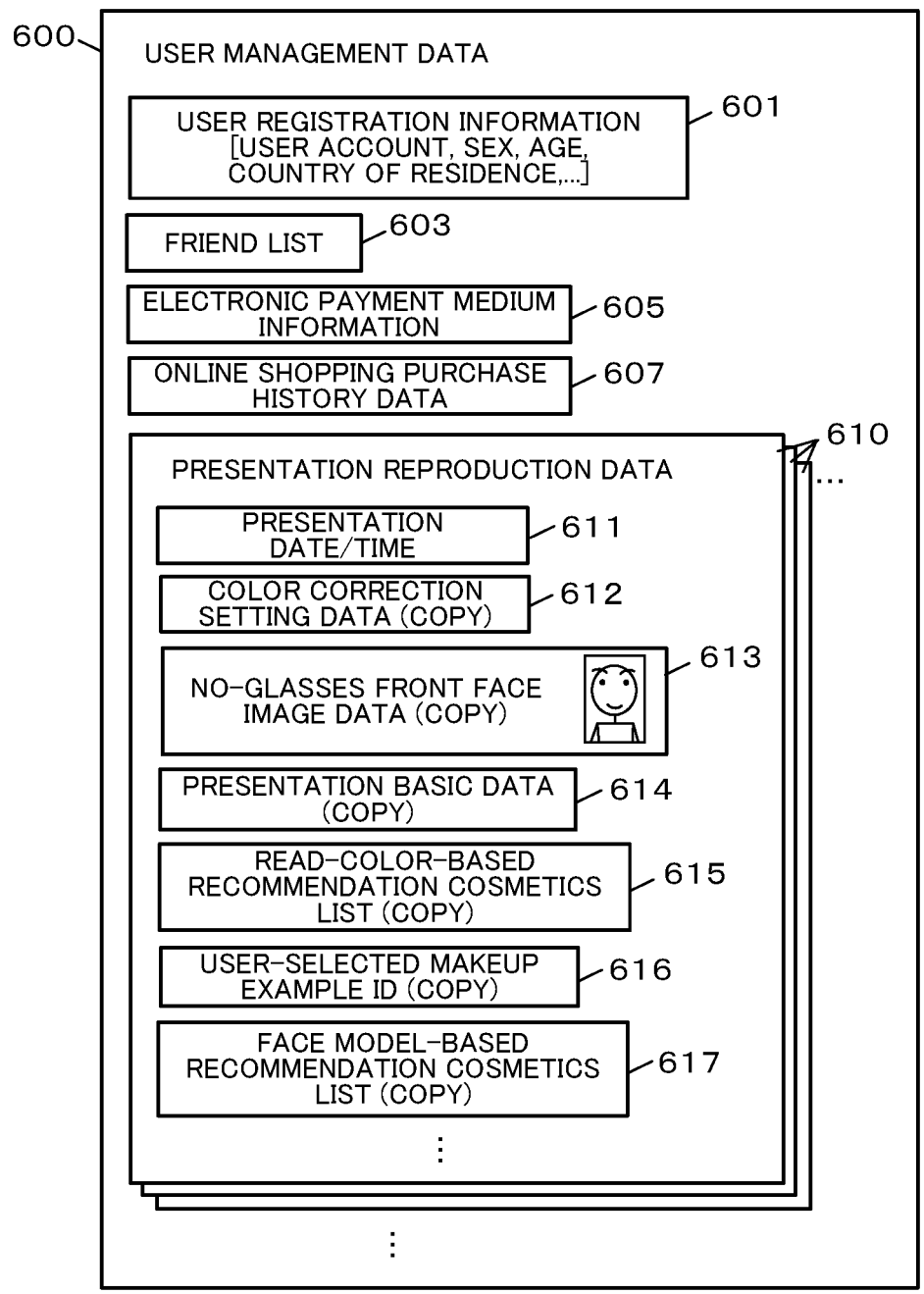
FIG. 16 is a diagram illustrating a data configuration example of user management data.

The user management data 600 is provided for each of the user having been through the predetermined registration procedures, and stores various types of data related to the user. For example, as shown in FIG. 16, a single item of the user management data 600 includes a unique user account 601, an SNS friend list 603, electronic payment medium information 605, online shopping purchase history data 607, and presentation reproduction data 610. It is clear that other kinds of data may also be included as appropriate.

The presentation reproduction data 610 stores various types of data used to reproduce the results of the recommended cosmetics presentation service provided in the past. The presentation reproduction data 610 is added for each time of the recommended cosmetics presentation service.

Specifically, the presentation reproduction data 610 includes a presentation date/time 611, color correction setting data 612, no-glasses front face image data 613, presentation basic data 614, a read-color-based recommendation cosmetics list 615, a user-selected makeup example ID 616, and a model-based recommendation cosmetics list 617. The data of the color correction setting data 612 to the model-based recommendation cosmetics list 617 are copies of the data having the same name included in the progress management data 700.

Figure 17:
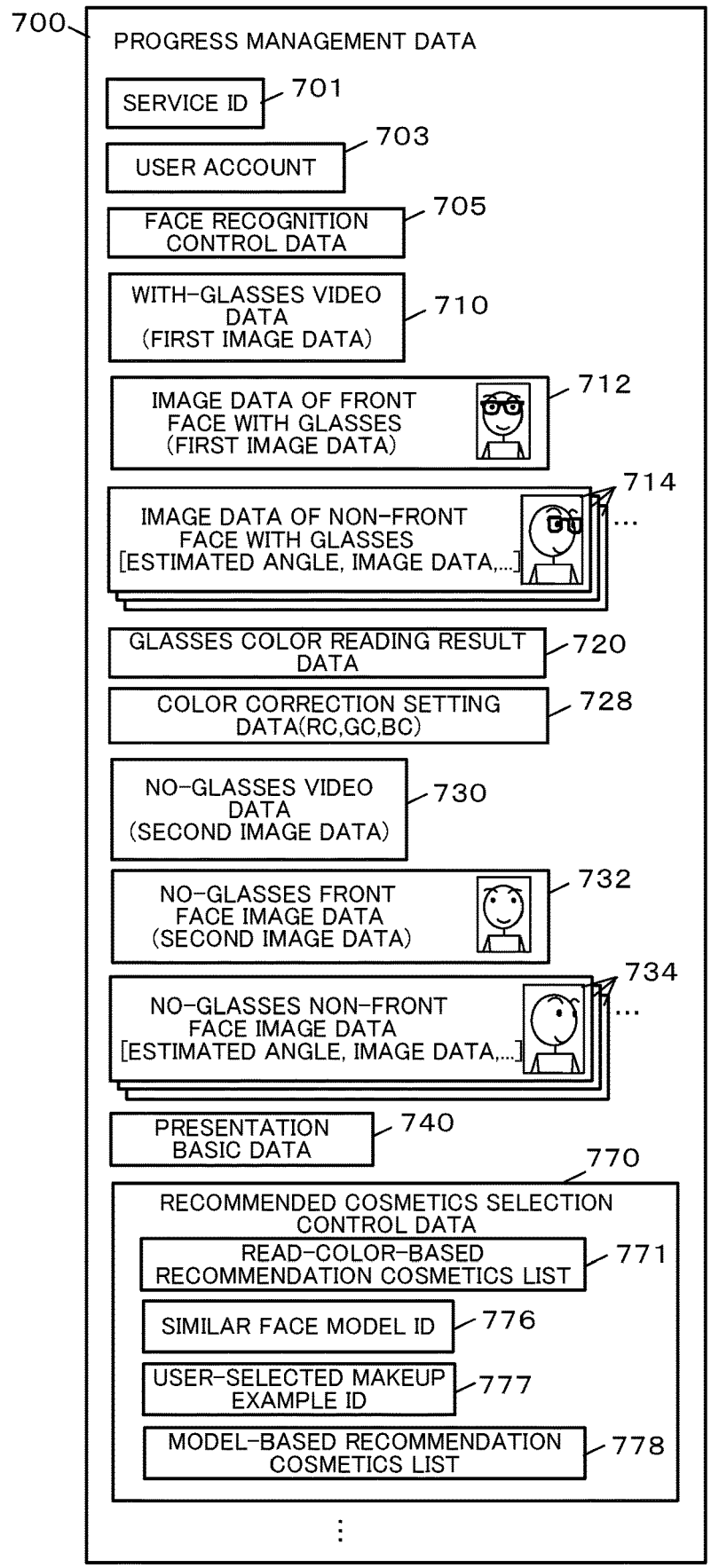
FIG. 17 is a diagram illustrating a data configuration example of progress management data.

Referring back to FIG. 15, the progress management data 700 stores various types of data related to the progress management of the recommended cosmetics presentation service. Specifically, for example, as shown in FIG. 17, the progress management data 700 includes a unique service ID 701, a user account 703 indicating the user 2 as the presentation destination, a face recognition control data 705 that stores various types of data related to face recognition control, with-glasses video data 710, with-glasses front face image data 712, with-glasses non-front face image data 714, the glasses color reading result data 720 (see FIG. 7), color correction setting data 728 (see FIGS. 6, 8), no-glasses video data 730, no-glasses front face image data 732, no-glasses non-front face image data 734, the presentation basic data 740 (see FIG. 10), and recommended cosmetics selection control data 770. It is clear that other kinds of data may also be included as appropriate.

The recommended cosmetics selection control data 770 stores various types of data related to the selection process of recommended cosmetics to be presented. Specifically, the recommended cosmetics selection control data 770 includes the read-color-based recommendation cosmetics list 771 (a list of cosmetics in the cosmetics database 510 found by a similarly search based on the read face color information 760), a similar face model ID 776, a user-selected makeup example ID 777 (ID of makeup example selected on the preference selection screen W12), and a model-based recommendation cosmetics list 778.

Figure 18:
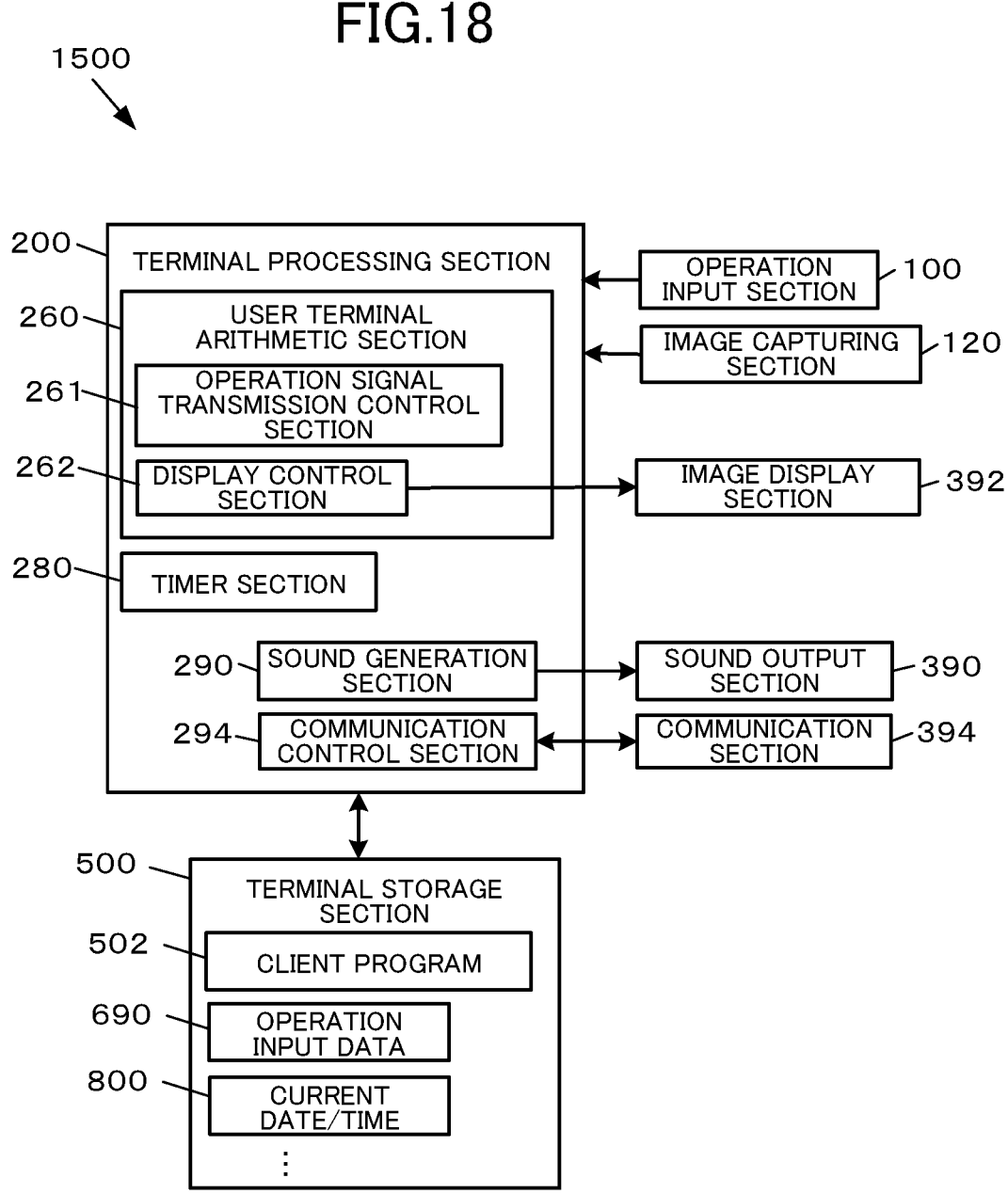
FIG. 18 is a functional block diagram illustrating a functional configuration example of a user terminal according to the first embodiment.

FIG. 18 is a functional block diagram illustrating a functional configuration example of the user terminal 1500. The user terminal 1500 includes an operation input section 100, an image capturing section 120, a terminal processing section 200, a sound output section 390, an image display section 392, a communication section 394, and a terminal storage section 500.

The operation input section 100 outputs operation input signals to the terminal processing section 200 in accordance with various operation inputs by the user. The operation input section 100 corresponds to the arrow key 1502, the button switch 1504, and the touch panel 1506 in FIG. 2.

The image capturing section 120 captures an image of the external view, generates the image data, and outputs the image data to the terminal processing section 200. The image capturing section 120 corresponds to the camera 1520, i.e., the image sensor module in FIG. 2.

The terminal processing section 200 controls input/output of data between the functional sections including the operation input section 100 and the terminal storage section 500. The terminal processing section 200 is implemented, for example, by a microprocessor such as a CPU or a GPU and electronic components including an IC memory. The terminal processing section 200 executes various calculation processes based on a predetermined program or data, operation input signals from the operation input section 100, and various types of data received from the server system 1100 to control the operations of the user terminal 1500. The terminal processing section 200 corresponds to the control board 1550 in FIG. 2.

The terminal processing section 200 according to the present embodiment includes a user terminal arithmetic section 260, a timer section 280, a sound generation section 290, and a communication control section 294.

The user terminal arithmetic section 260 controls the user terminal 1500 so as to execute its function as a client device that communicates with the server system 1100. Specifically, the user terminal arithmetic section 260 includes an operation signal transmission control section 261 and a display control section 262.

The operation signal transmission control section 261 performs a process of transmitting various types of data and requests to the server system 1100 in accordance with an operation performed on the operation input section 100.

The display control section 262 performs control to display various screens and the like concerning the services based on the various types of data and the like received from the server system 1100. Then, the display control section 262 outputs the generation output of the image signal for displaying those images to the image display section 392.

The image display section 392 displays various images based on the image signals input from the display control section 262. For example, the image display section 392 can be implemented by an image display device, such as a flat panel display, a projector, or a head-mounted display. In the present embodiment, the image display section 392 corresponds to the touch panel 1506 illustrated in FIG. 2.

Although the screen images concerning various services provided to the user are generated in the server system 1100, it is also possible to generate them in the user terminal 1500. In this case, the display control section 262 executes various controls for generating a screen, such as the control of objects arranged in a virtual three-dimensional space for generating a 3DCG, an image composition process, and the like.

The timer section 280 uses a system clock to measure the current date and time, a limited time period, and the like.

The sound generation section 290 is implemented, for example, by a processor such as a Digital Signal Processor (DSP) or a sound synthesizing IC, or an audio codec or the like for playing a sound file, and generates sound signals for music, sound effects, or various types of operational sounds, and outputs the generated signals to the sound output section 390.

The sound output section 390 is implemented by a device that outputs (emits) sound based on the sound signal input from the sound generation section 290. The sound output section 390 corresponds to the speaker 1510 in FIG. 2.

The communication control section 294 executes data processing concerning the data communication, and performs data exchange with external devices via the communication section 394.

The communication section 394 is connected to the network 9 to enable the communication. For example, the communication section 394 can be implemented by a transceiver, a modem, a Terminal Adapter (TA), a jack for wired communication cable, a control circuit or the like. The communication section 394 corresponds to the wireless communication module 1553 illustrated in FIG. 2.

The terminal storage section 500 stores programs for causing the terminal processing section 200 to implement given functions, as well as various types of data and the like. The terminal storage section 500 is also used as a work area for the terminal processing section 200, and temporarily stores results of calculations executed by the terminal processing section 200 in accordance with various programs, input data input from the operation input section 100, or the like. These functions are implemented by an IC memory such as a RAM or a ROM, a magnetic disc such as a hard disc, an optical disc such as a CD-ROM or a DVD, or the like. The terminal storage section 500 corresponds to the IC memory 1552, the memory card 1540, or the like included in the control board 1550 in FIG. 2. The terminal storage section 500 may be implemented by an online storage.

Specifically, the terminal storage section 500 stores a client program 502 for causing the terminal processing section 200 to function as the user terminal arithmetic section 260, operation input data 690, and current date/time 800. It is clear that other kinds of data may also be stored as appropriate.

Figure 19:
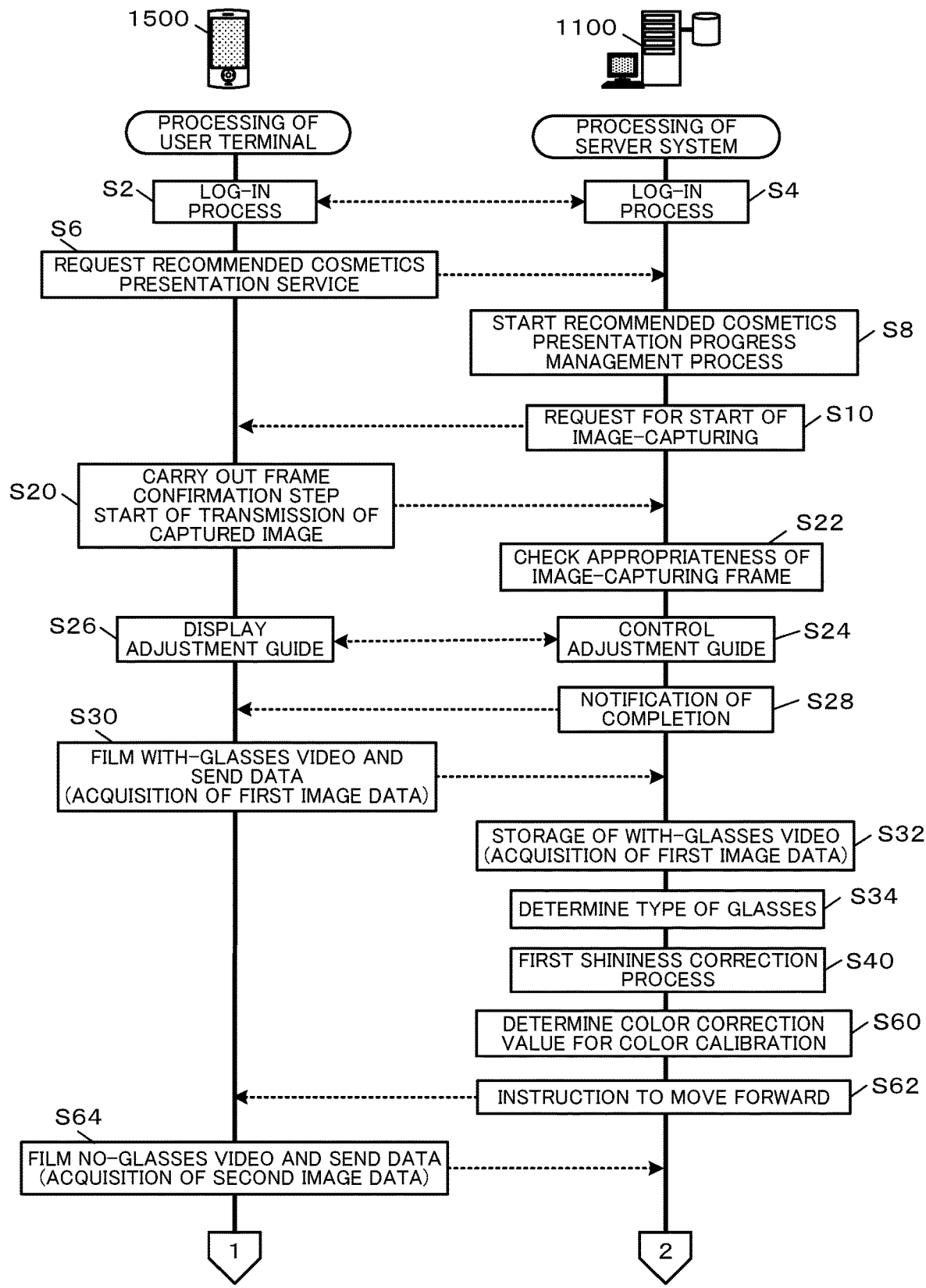
FIG. 19 is a flowchart for describing a flow of processing in a server system and a user terminal concerning a recommended cosmetics presentation service.
Figure 20:
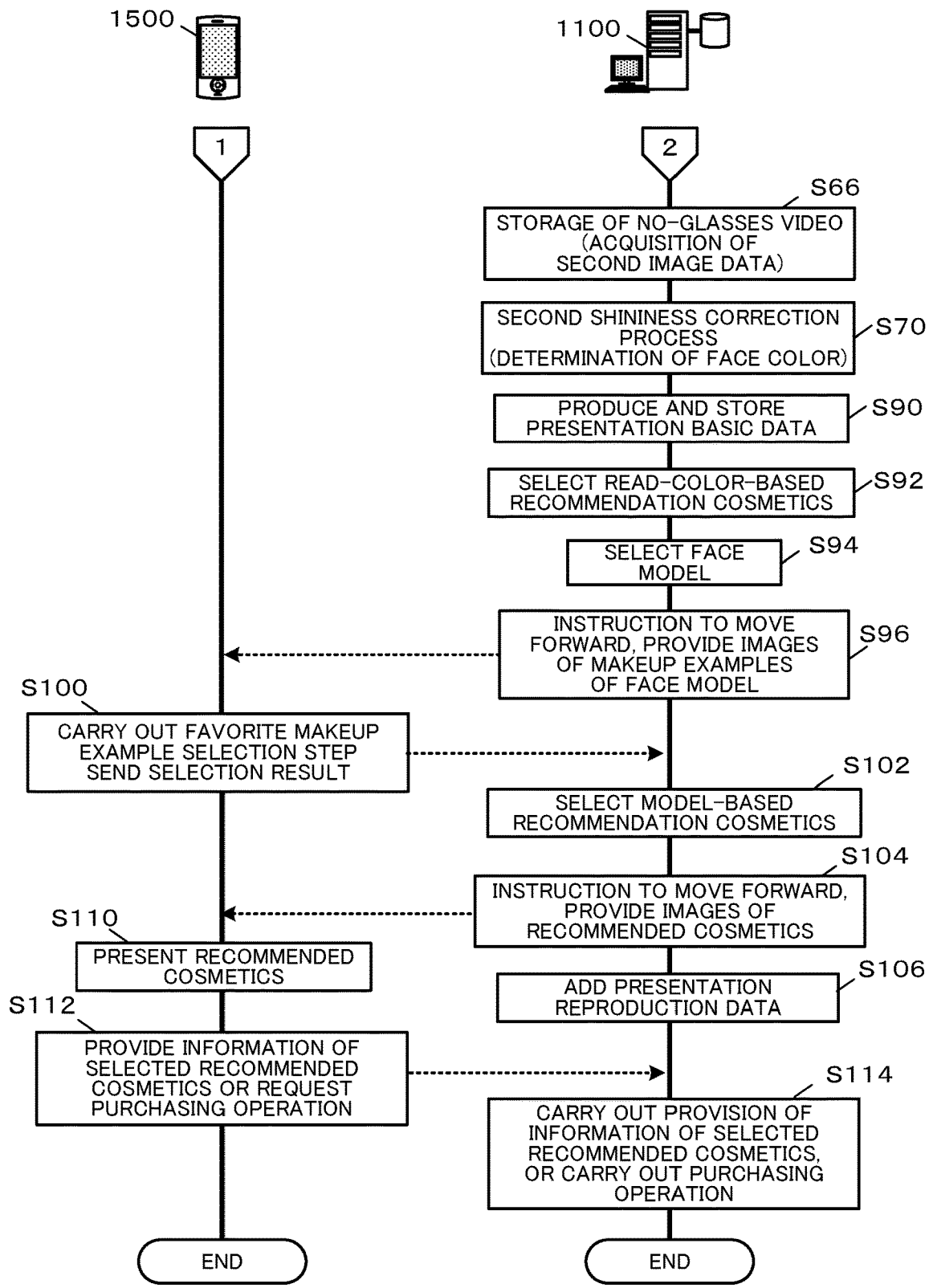
FIG. 20 is a flowchart continued from FIG. 19.

FIGS. 19 and 20 are flowcharts for describing a flow of processing in the server system 1100 and the user terminal 1500 concerning the recommended cosmetics presentation service. Each flow of the process described herein is performed by establishing the communication connection between the user terminal 1500 in which the client program 502 is executed and the server system 1100 in which the server program 501 is executed. When the user 2 operates the user terminal 1500, an operation input is sent to the server system 1100.

As illustrated in FIG. 19, the user terminal 1500 and the server system 1100 perform log-in procedures (steps S2 and S4).

After the log-in procedures, in response to the detection of the input of the predetermined "recommended cosmetics presentation service start operation", the user terminal 1500 sends a request for the service to the server system 1100 (step S6).

In response to the reception of the request, the server system 1100 starts a progress management process of the recommended cosmetics presentation service (step S8). With this process, the progress management data 700 is created (see FIG. 17). Then, the server system 1100 sends an image capturing start request to the user terminal 1500 (step S10).

In response to the reception of the image capturing start request, the user terminal 1500 carries out a frame confirmation step (step S20). As a result, the frame confirmation screen W5 is displayed in the user terminal 1500, and the image data captured by the camera 1520 is sent to the server system 1100 (see FIG. 5).

The server system 1100 detects the marker 13 of the glasses 10 and the face parts from the image captured by the user terminal 1500, and checks the appropriateness of the image-capturing frame (step S22). If necessary, guidance display control and display are performed between the server system 1100 and the user terminal 1500 to optimize the image-capturing frame (steps S24 and S26). Then, when it is determined that the image-capturing frame is appropriate, the server system 1100 notifies the user terminal 1500 of the completion of the appropriateness check (step S28).

The completion notification also serves as an instruction to move forward, and the user terminal 1500 starts the first image capturing step, that is, the image capturing process of with-glasses video (step S30). In the user terminal 1500, the first image capturing screens W6a and W6b are displayed (see FIG. 6), and the captured "with-glasses video" data is sent to the server system 1100.

The server system 1100 saves the with-glasses video data 710 (see FIG. 17) (step S32), and executes the first shininess correction process (step S40; see FIG. 6). During the process, the color of each color pattern 14 of the glasses 10 is read, and the server system 1100 determines the color correction value for color calibration (step S60), and sends a predetermined instruction to move forward to the user terminal 1500 (step S62).

In response to the reception of the instruction to move forward, the user terminal 1500 starts the second image capturing step, that is, the image capturing process of no-glasses video (step S64). In the user terminal 1500, the second image capturing screens W9a and W9b are displayed (see FIG. 9), and the captured "no-glasses video" data is sent to the server system 1100.

Moving to FIG. 20, the server system 1100 saves the no-glasses video data 730 (see FIG. 17) (step S66), and executes the second shininess correction process (step S70; see FIG. 9). Then, the server system 1100 saves information such as the facial feature amount 750 and the face color information 760 of the user 2 obtained in the second shininess correction process as presentation basic data 740 (step S90; see FIG. 10).

Subsequently, the server system 1100 performs a process concerning the selection of recommended cosmetics (steps S92 to S102).

Specifically, the server system 1100 selects cosmetics based on the read-color-based recommendation (step S92; see FIG. 11) and saves the result as the read-color-based recommendation cosmetics list 771.

The server system 1100 then selects a face model similar to the face of the user 2 and saves the selection results as the similar face model ID 776 (step S94).

Then, the server system 1100 provides the instruction to move forward and the makeup image data 553 (see FIG. 12) of the face model to the user terminal 1500 (step S96).

In response to the reception of the instruction to move forward, the user terminal 1500 executes the makeup example selection step, displays the preference selection screen W12, and sends the selection result by the user 2 to the server system 1100 (step S100).

The server system 1100 determines recommended cosmetics of the model-based recommendation with the list of cosmetics used 554 (see FIG. 12) for the makeup example corresponding to the received selection result by the user, and saves them as the model-based recommendation cosmetics list 778 (step S102; see FIG. 17).

Then, the server system 1100 sends the predetermined instruction to move forward and the images of the recommended cosmetics to the user terminal 1500 (step S104), and adds new presentation reproduction data 610 to the user management data 600 of the user 2 (step S106).

Meanwhile, the user terminal 1500, which has received the instruction to move forward and the like in step S104, displays the presentation screen W13 (see FIG. 13) and presents the recommended cosmetics to the user 2 (step S110). A cosmetics thumbnail image 26*c* of the presentation screen W13 also serves as detailed information of the corresponding cosmetics and as an operation icon for starting purchase procedures. Therefore, in response to the detection of a touch operation on the cosmetics thumbnail image 26*c*, the user terminal 1500 provides information of the cosmetics corresponding to the thumbnail image, and sends a request for the purchase procedures to the server system 1100 (step S112).

In response to the reception of the request for the purchase procedures, the server system 1100 carries out a process for purchasing the requested cosmetics through an online shopping service (step S114).

As described above, according to the present embodiment, the images of the standard color for color calibration and the object to be subjected to color reading are captured in the same image at a very close distance because of the use of the glasses 10. Therefore, for example, even in a shooting environment where the user takes a selfie using a smartphone camera at home, it becomes possible to easily and accurately obtain the color information of the face of the user.

Since the process is carried out in two steps: (1) the color calibration is performed with the first image data (with-glasses video and images captured from the video), and (2) the face color is read (determined) with the second image data (no-glasses video and images captured from the video). Accordingly, it becomes possible to also read the color of the invisible part hidden behind the glasses, thereby reading the color without being affected by the shadow of the glasses.

Technically, in the actual operation situation, the state of the ambient light in the first image data and the state of the ambient light in the second image data may not be the same in some cases. However, since the user moves only slightly to remove the glasses in the process between the former and the latter, it is possible to take the second image data continuously from the acquisition of the first image data. Thus, the state of the ambient light is substantially the same in both data.

In view of the user, it is possible to receive recommended cosmetics that suit them using the Internet and a smartphone at home, and purchase the recommended cosmetics also at home. Therefore, it is possible to achieve a system for presenting recommended cosmetics, which is more convenient than the previously-known method.

2. Second Embodiment

A second embodiment is described below. In comparison between the first embodiment and the second embodiment, they are different in that the function of the recommended cosmetics presentation control section 210 is implemented by the server system 1100 in the first embodiment whereas the function is implemented by the user terminal 1500 in the second embodiment. The following mainly describes differences from the first embodiment, and the components that are the same as those in the first embodiment are denoted with the same referential numerals, and duplicate description will be omitted.

Figure 21:
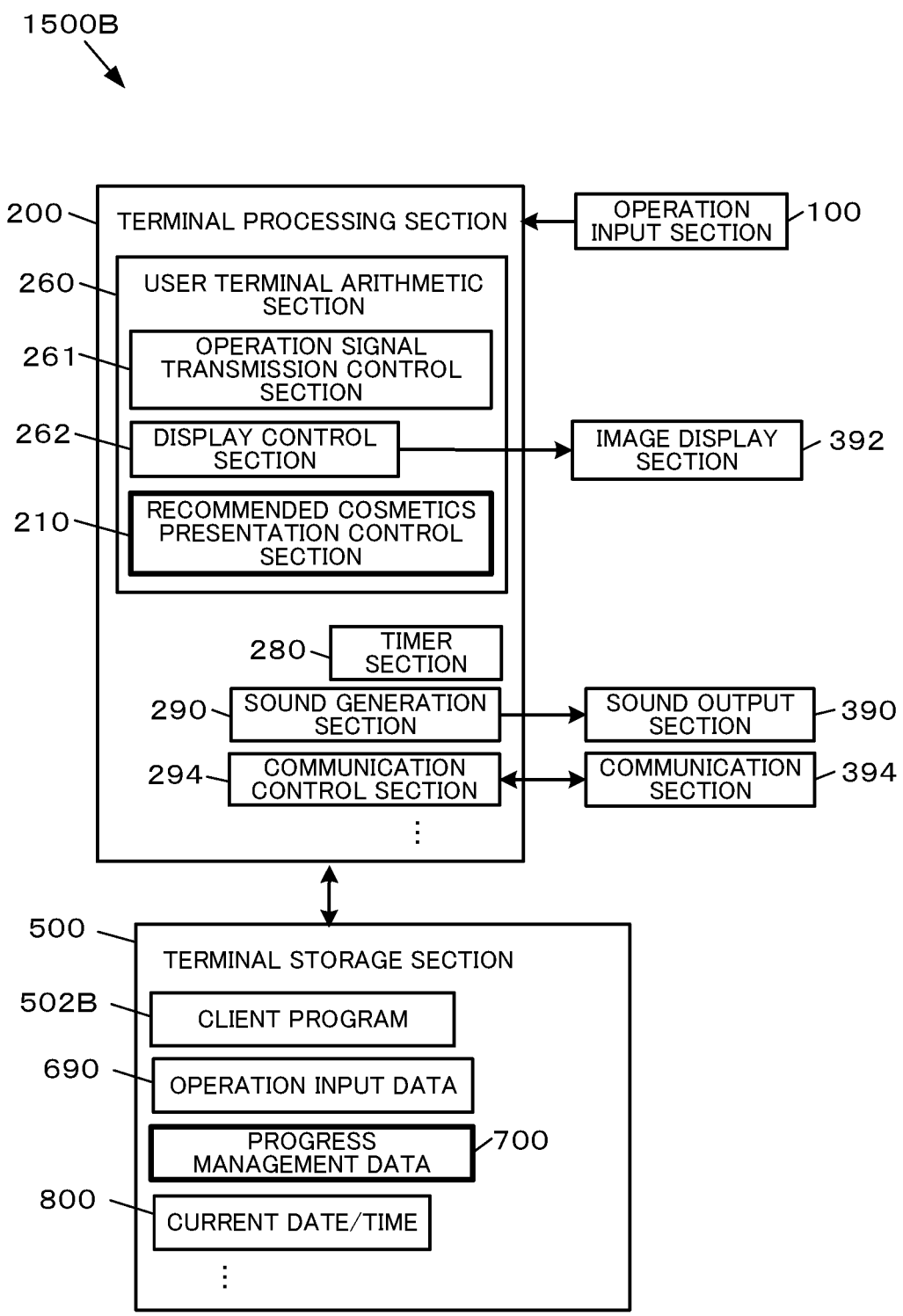
FIG. 21 is a functional block diagram illustrating a functional configuration example of a user terminal according to a second embodiment.

FIG. 21 is a functional block diagram illustrating a functional configuration example of a user terminal 1500B according to the present embodiment. The user terminal 1500B of the present embodiment includes the recommended cosmetics presentation control section 210 in the user terminal arithmetic section 260 of the first embodiment.

Correspondingly, although not shown in the diagrams, the recommended cosmetics presentation control section 210 is not included in the functional configuration of the server system 1100 of the present embodiment. In addition, a client program 502B of the present embodiment contains an element that allows the terminal processing section 200 to enables the function of the recommended cosmetics presentation control section 210. Further, the progress management data 700 is stored in the terminal storage section 500.

Figure 22:
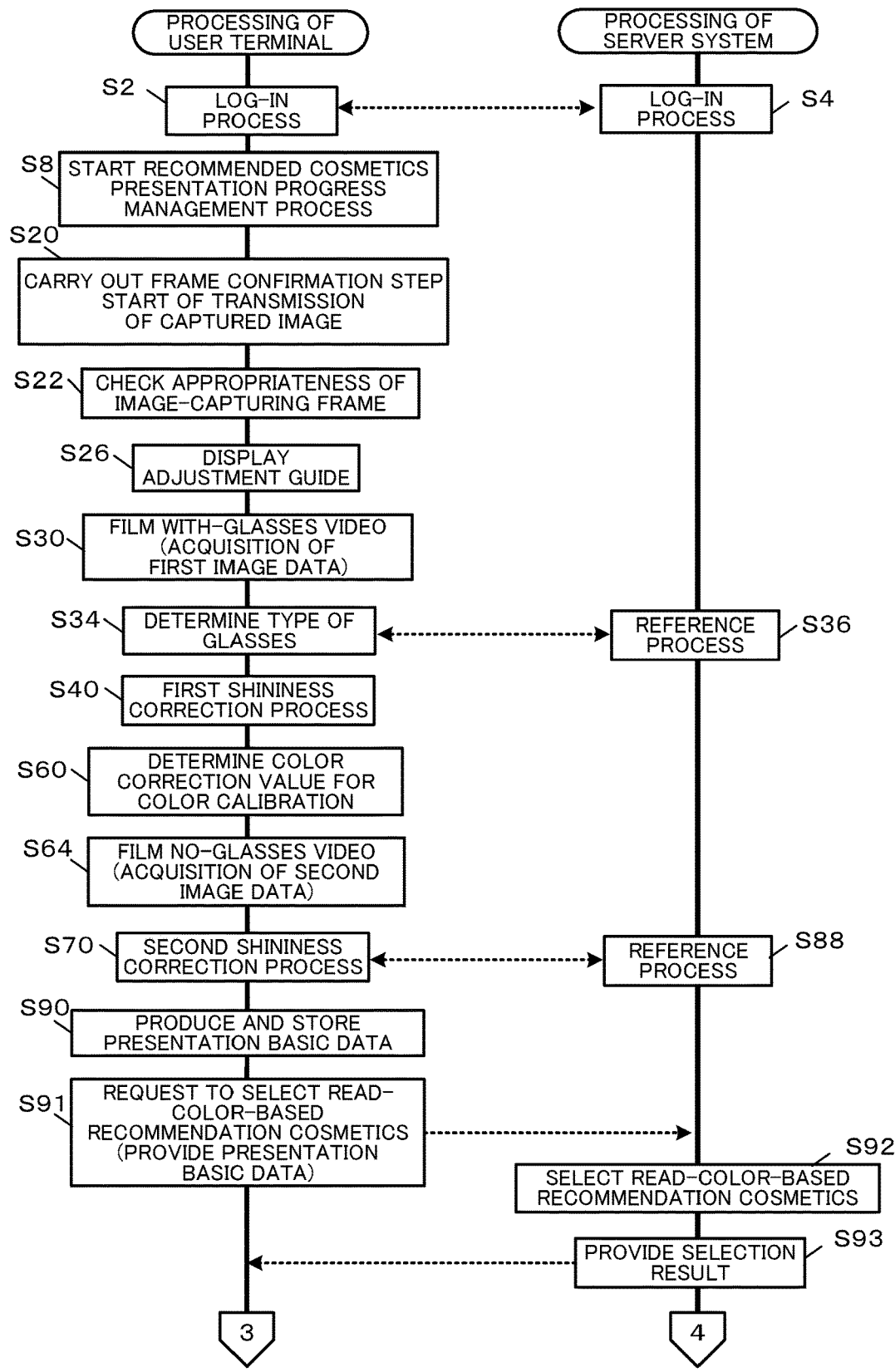
FIG. 22 is a flowchart for describing a flow of processing in a server system and a user terminal concerning a recommended cosmetics presentation service according to the second embodiment.
Figure 23:
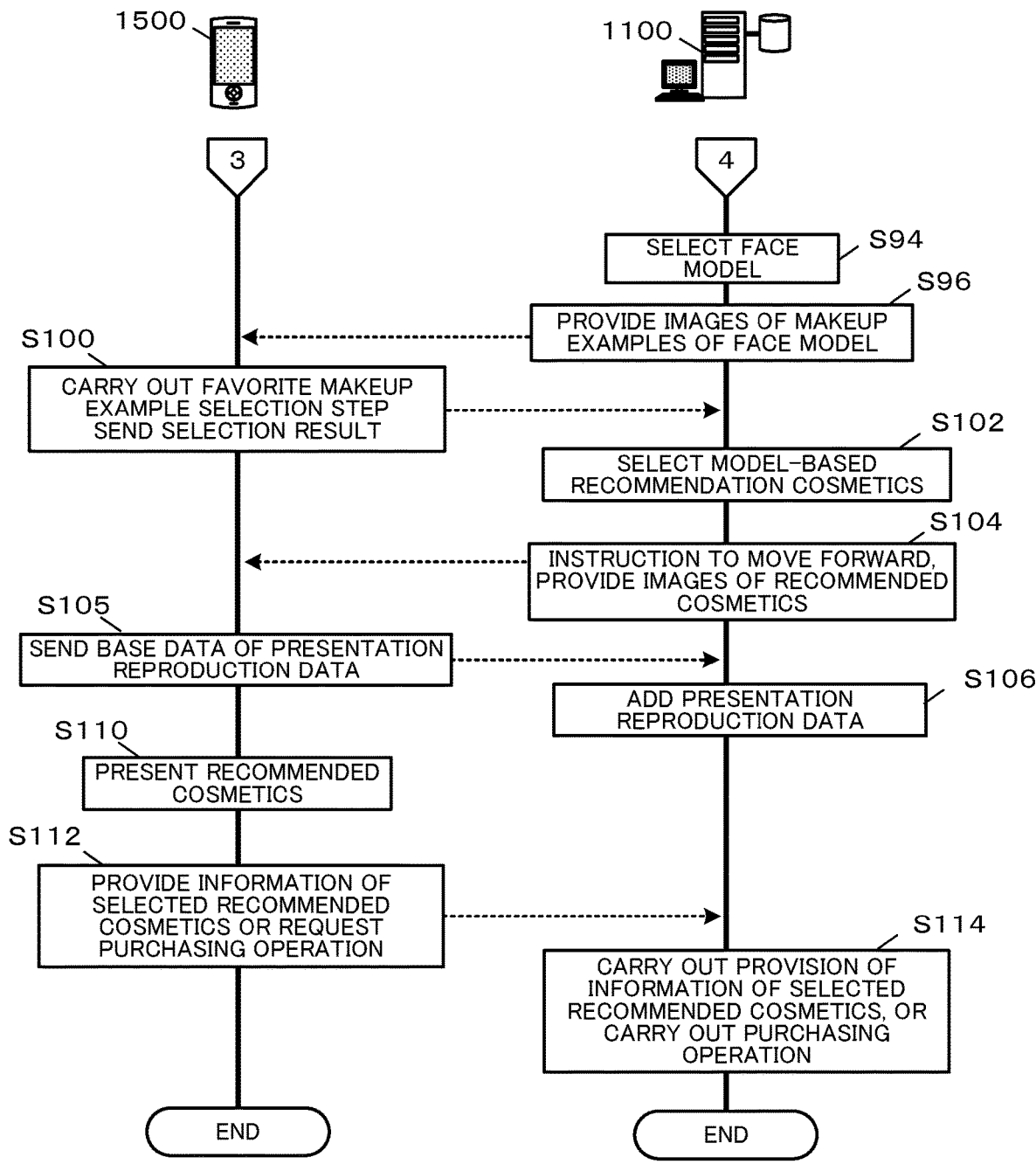
FIG. 23 is a flowchart continued from FIG. 22.

FIGS. 22 and 23 are flowcharts corresponding to FIGS. 19 and 20 of the first embodiment.

As shown in these diagrams, the steps concerning the recommended cosmetics presentation control section 210 is mainly performed in the user terminal 1500B. However, the database and various types of definition data are stored and managed in/by the server system 1100 also in the present embodiment, and the user terminal 1500B sends a reference request to the server system 1100 as necessary to refer to them. The server system 1100 executes the reference process each time of the request (for example, steps S36 and S88).

In the reference process, the server system 1100 sends and provides the information requested by the reference request to the user terminal 1500B. Specifically, corresponding to step S34 of the present embodiment, the server system 1100 sends the glasses registration data 530 to the user terminal 1500B as a reference process (step S36). Further, corresponding to step S70 of the present embodiment, the server system 1100 sends the color reading position definition data 520 to the user terminal 1500B (step S88).

To select cosmetics of read-color-based recommendations, the user terminal 1500B sends the presentation basic data 740 to the server system together with a selection request (step S91). As a result, the server system 1100 selects cosmetics of read-color-based recommendations (step S92), and provides the selection result to user terminal 1500B (step S93).

Moving to FIG. 23, when the user terminal 1500 receives the image of recommended cosmetics from the server system 1100, the user terminal 1500 sends the base data of the copy of the presentation reproduction data 610 (see FIG. 16) to the server system 1100 (step S105). The server system 1100 adds the presentation reproduction data 610 based on the received data (step S106).

With the present embodiment, the same effect as that of the first embodiment can be obtained.

MODIFICATION EXAMPLE

The embodiments to which the present invention is applied have been described so far. However, the modes to which the present invention is applicable are not limited to the foregoing embodiments, and the components can be added, omitted, or changed as appropriate.

Modification Example 1

For example, in the first embodiment, all the functions of the recommended cosmetics presentation control section 210 are implemented by the server system 1100, whereas all the functions are implemented by the user terminal 1500B in the second embodiment. However, an intermediate configuration is also possible. More specifically, it is possible to share the function of the recommended cosmetics presentation control section 210 between the server system 1100 and the user terminal 1500.

Modification Example 2

Further, although the method for selecting the cosmetics of read-color-based recommendation and the method for selecting the cosmetics of model-based recommendation are the same regardless of the type of the glasses 10 in the above embodiment, it is also possible to add special conditions in selecting the cosmetics of read-color-based recommendation and the cosmetics of model-based recommendation depending on the type of the glasses 10.

Figure 24:
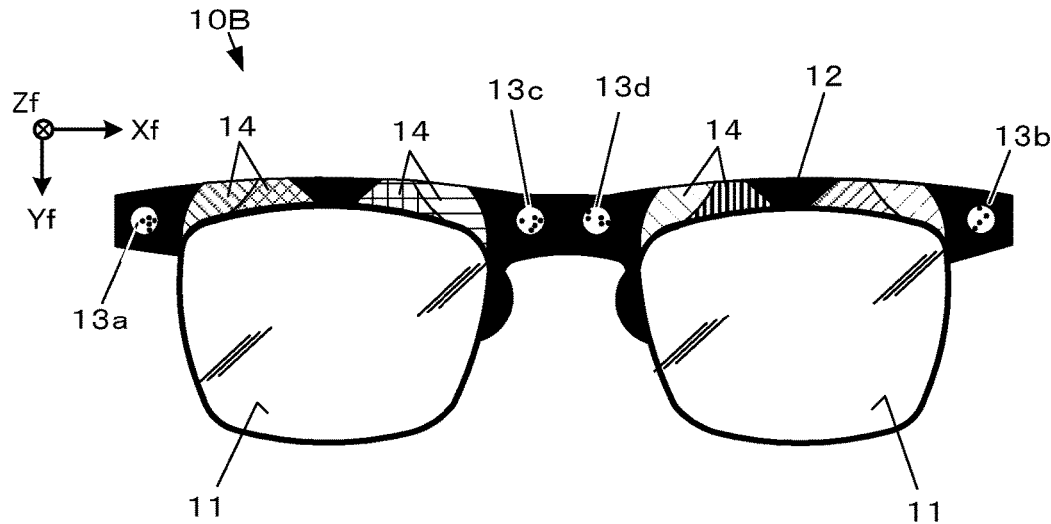
FIG. 24 is a diagram illustrating a modification example of glasses.

For example, glasses 10B shown in FIG. 24 has a dedicated half-rim type (or brow type) design created by a collaboration of a cosmetics manufacturer and the operator of the recommended cosmetics presentation control system 1000.

Figure 25:
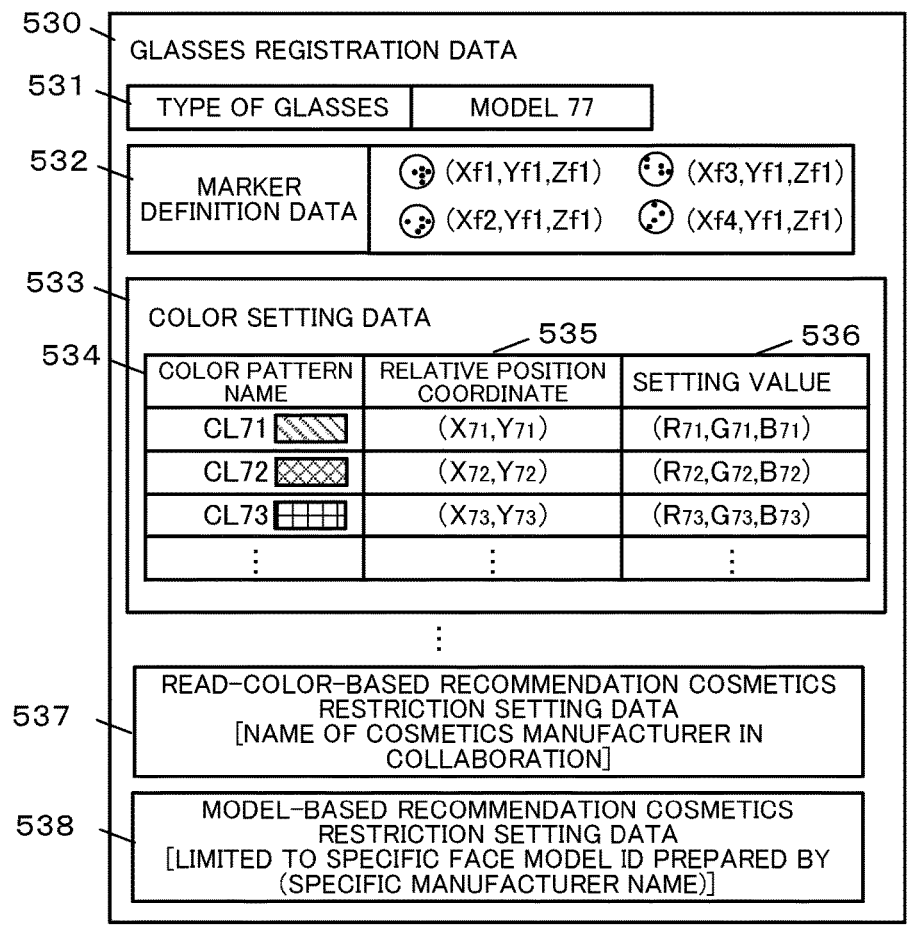
FIG. 25 is a diagram illustrating a modification example of glasses registration data.

Further, as shown in FIG. 25, the glasses registration data 530 corresponding to the glasses 10B includes read-color-based recommendation cosmetics restriction setting data 537 and model-based recommendation cosmetics restriction setting data 538. In the read-color-based recommendation cosmetics restriction setting data 537, the name of the cosmetics manufacturer in the collaboration, the name of the cosmetics series of the cosmetics manufacturer in the collaboration, and a list of products of the cosmetics manufacturer in the collaboration are set. The model-based recommendation cosmetics restriction setting data 538 is a list of the face model ID 542 of the face model registration data 541 prepared by the cosmetics manufacturer in the collaboration (see FIG. 12).

In the step of selecting the cosmetics of read-color-based recommendation (for example, step S92 in FIG. 20), if the glasses 10B are used, the cosmetics that match the content of the read-color-based recommendation cosmetics restriction setting data 537 are extracted from among the cosmetics registered in the cosmetics database 510 to enable selection from them. Further, conversely, if the glasses 10B are not used, it is possible to select recommended cosmetics from those excluded from the cosmetics that match the content of the read-color-based recommendation cosmetics restriction setting data 537.

Similarly, in the step of selecting a face model (for example, step S94 in FIG. 20), if the glasses 10B are used, face models that match the content of the model-based recommendation cosmetics restriction setting data 538 are extracted, and a similar face model is selected from them. Further, conversely, if the glasses 10B are not used, it is possible to select a face model from those excluded from the face models that match the content of the model-based recommendation cosmetics restriction setting data 538.

In other words, when a particular type of the glasses 10B are used, it is possible to add a structure such that the recommended cosmetics are selected from the cosmetics group of the manufacturer as the collaboration partner in creating the glasses, or a structure such that the user can select a desired makeup example from among the limited makeup examples only when the user 2 uses the glasses 10B, thereby selecting the recommended cosmetics.

Modification Example 3

In addition, the presentation reproduction data 610 (see FIG. 16) of the user management data 600 can be configured to allow reference of the user associated with the data when the user uses other services provided by the server system 1100.

For example, if the server system 1100 provides a makeup simulation service, the server processing section 200s serves as a makeup simulation management section that performs the control of makeup simulation, and generates a simulation image in which the cosmetics recommended by the recommended cosmetics presentation service are applied to the user who receives the recommendation, and represents the generated image to the user.

Upon the generation of the simulation image, the server system 1100 synthesizes the colors of the cosmetics of the read-color-based recommendation cosmetics list 615 and the model-based recommendation cosmetics list 617 on the no-glasses front face image data 613 (see FIG. 16). In this process, the server system 1100 may perform color calibration based on any of the no-glasses front face image data 613, the read-color-based recommendation cosmetics list 615, and the model-based recommendation cosmetics list 617, by using the color correction setting data 612. According to this structure, a simulation image can be generated with the correct cosmetics color.

Modification Example 4

Figure 26:
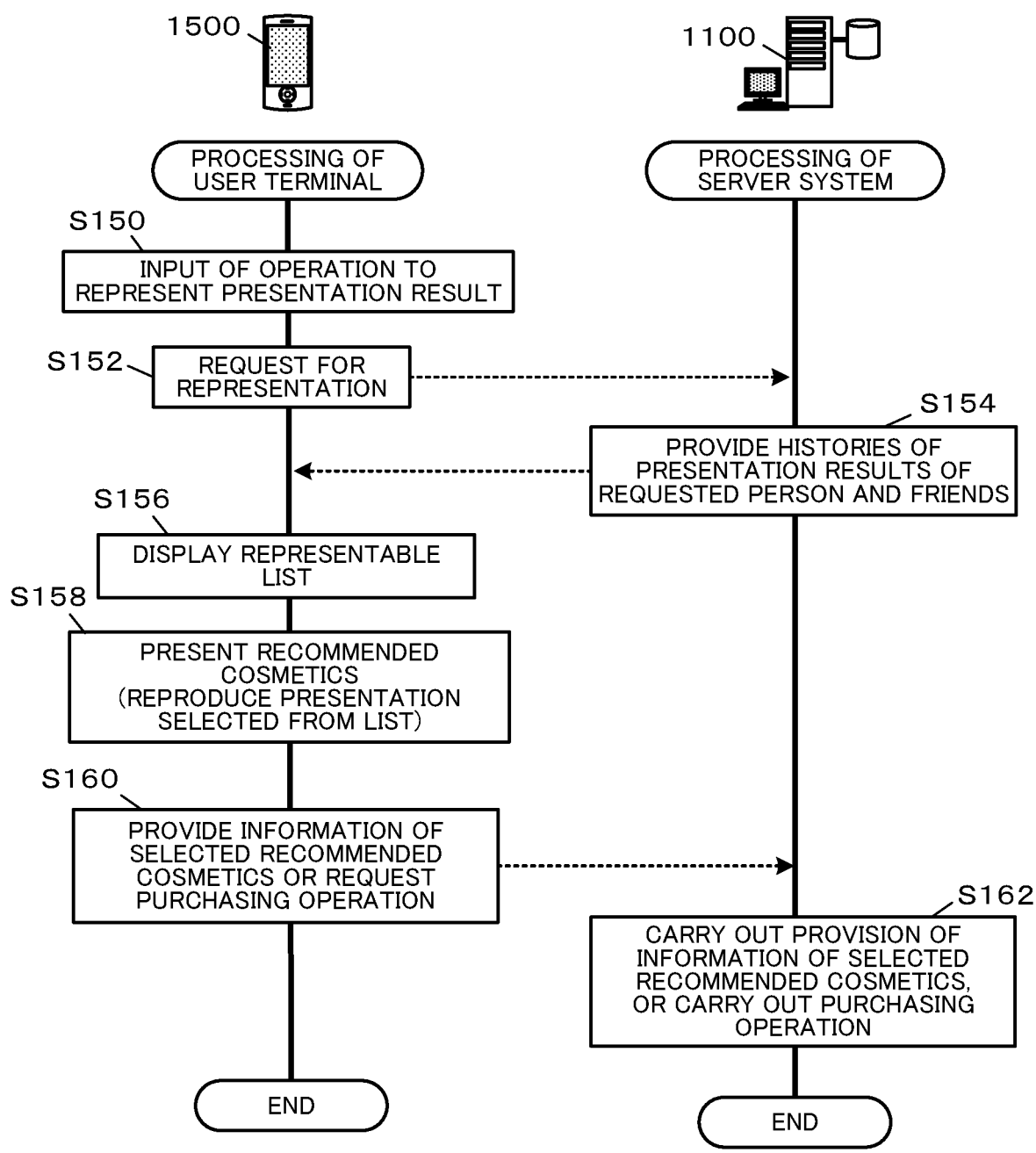
FIG. 26 is a flow chart illustrating an example of use of presentation reproduction data.

Further, for example, as shown in FIG. 26, the presentation reproduction data 610 can be used not only by the owner user but also by the friend user of the owner user.

This is specifically described below based on the first embodiment. When the user terminal 1500 detects a predetermined representation operation input (step S150), the user terminal 1500 sends a predetermined representation request to the server system 1100 (step S152). In response to the reception of the request, the server system 1100 provides the presentation reproduction data 610 of the user who made the request and also the presentation reproduction data 610 of a friend user of the user (a user registered in the friend list 603; see FIG. 16) in a searchable manner (step S154).

In response to the acquisition of a set of the presentation reproduction data 610 and the user account, the user terminal 1500 presents a choice to the user to enable the user to select desirable presentation to reproduce (step S156), and then represents the recommended cosmetics in the presentation screen W13 (see FIG. 13) based on the selected presentation reproduction data 610 (step S158).

As in the first embodiment, the cosmetics thumbnail image 26c of the presentation screen W13 also serves as detailed information of the corresponding cosmetics and as an operation icon for starting purchase procedures.

Therefore, in response to the detection of a touch operation on the represented cosmetics thumbnail image 26c by the user, the user terminal 1500 provides information of the cosmetics corresponding to the thumbnail image, and sends a request for the purchase procedures to the server system 1100 (step S160). In response to the reception of the request for the purchase procedures, the server system 1100 carries out a process for purchasing the requested cosmetics through an online shopping service (step S162).

This structure allows a friend user of the owner user of the presentation reproduction data 610 to purchase the recommended cosmetics as a gift to the owner user.

Modification Example 5

In addition, the above embodiment is structured such that the color of each position of the face is read (determined) from the "no-glasses face image". This is to ensure that no face parts are hidden by the glasses 10, and also to eliminate the possibility of the influence of shadows or light reflections of the glasses 10 on color reading. However, this will not be a problem if the color reading position is limited to a position where such a concern does not occur. In this case, it is possible to omit components related to the second image data, such as the acquisition of the "no-glasses video", the capture of the "no-glasses face image" from the video, the reading of the colors from the "no-glasses face image", and the like.

Modification Example 6

In addition, the above embodiment can be used as a system for over-the-counter sales at cosmetics stores. Specifically, although the user terminal 1500 is a smartphone owned by the user in the example described in the above embodiment, in this example, a store installation type information terminal (for example, so-called a smart mirror, which uses a large smartphone as a makeup mirror) having the same function as the user terminal 1500 is used. Then, it may be structured such that the server system 1100 also serves as a stock management server that stores and manages a stock database for managing stock information for each store selling cosmetics, and that the recommended cosmetics may be presented after being selected from "in-stock" products based on the stock database separately from the selection from the cosmetics database 510.

Further, when the above embodiment is used as a system for over-the-counter sales, the user terminal 1500 in the above embodiment may be composed of a store installation type main information terminal having a camera and a sub-information terminal worn by a store staff. Then, it may be structured such that the "with-glasses image" and the "no-glasses image" of the user, who is a customer, are captured by the main information terminal, and the recommended cosmetics are presented by the sub-information terminal. In this case, the recommended cosmetics, which are also in-stock products, can be presented to the store staff. This ensures excellent sales promotion effects.

The management of customer information between stores are centrally managed by the server system 1100. Therefore, it is possible to read the user management data 600 of the user by performing face authentication based on the "with-glasses image" of the user, who is a customer, in the information terminal installed in the store. This enables use of historical data and provision of the same services even in a different store. The presentation basic data 614 and the no-glasses front face image data 613 can be used as the dictionary data for face authentication (see FIG. 16). It is clear that the face authentication for reading the user management data 600 may be replaced with authentication using a user registration card issued for each user.

REFERENCE NUMERALS

2: user
4: shininess
10: glasses
12: frame
13: marker
14: color pattern
200s: server processing section
210: recommended cosmetics presentation control section
212: image acquisition control section
214: face-related color determination section
216: face recognition control section
218: facial feature amount determination section
220: first shininess correction processing section
222: second shininess correction processing section
230: presentation control section
500s: server storage section
501: server program
502: client program
510: cosmetics database
520: color reading position definition data
530: glasses registration data
532: marker definition data
533: color setting data
534: color pattern name
540: model database
541: face model registration data
543: facial feature amount
544: face color information
545: bare face image data
550: makeup example registration data
552: makeup theme tag
553: makeup image data
554: list of cosmetics used
600: user management data
701: service ID
710: with-glasses video data
720: glasses color reading result data
728: color correction setting data
730: no-glasses video data
740: presentation basic data
750: facial feature amount
760: face color information
761: color reading result data
770: recommended cosmetics selection control data
771: read-color-based recommendation cosmetics list
774: model-based recommendation cosmetics list
776: similar face model ID
778: model-based recommendation cosmetics list
1000: recommended cosmetics presentation control system
1100: server system

1500: user terminal
1520: camera

What is claimed is:

1. A control system comprising:
   glasses including a frame and no lenses,
   the frame having a plurality of predetermined colors at respective predetermined positions, and including markers, at least one marker being located on a left side of a front of the frame, and at least one marker being located on a right side of the front of the frame; and
   a computer system comprising:
      an image acquisition section for acquiring image data obtained by capturing images of a user wearing the glasses at different orientations; and
      a determination section configured to:
         determines a location of at least one of the markers within the images of the user wearing the glasses;
         determines a face orientation of the user based on the determined location of the at least one marker; and
         determine a color of each position of a face of the user based on the image data using the predetermined colors and the determined face orientation.

2. The control system as defined in claim 1, wherein the determination section further determines a hair color of the user.

3. The control system as defined in claim 1, wherein each of the plurality of colors is located in a predetermined substantially rectangular area along a rim of the frame.

4. A control method executed by a computer system, the method comprising the steps of:
   acquiring image data obtained by capturing images of a user wearing a glasses frame having no lenses at different orientations, the frame having a plurality of predetermined colors at respective predetermined positions, and including markers, at least one marker being located on a left side of a front of the frame, and at least one marker being located on a right side of the front of the frame; and
   determining a location of at least one of the markers within the images of the user wearing the glasses frame;
   determining a face orientation of the user based on the determined location of the at least one marker; and
   determining a color of each position of a face of the user based on the image data using the predetermined colors and the determined face orientation.

5. The control method as defined in claim 4, wherein each of the plurality of colors is located in a predetermined substantially rectangular area along a rim of the frame.

* * * * *